(12) United States Patent
Fuzell-Casey et al.

(10) Patent No.: US 11,271,993 B2
(45) Date of Patent: Mar. 8, 2022

(54) STREAMING MUSIC CATEGORIZATION USING RHYTHM, TEXTURE AND PITCH

(71) Applicant: APERTURE INVESTMENTS, LLC, Mercer Island, WA (US)

(72) Inventors: Jacquelyn Fuzell-Casey, Mercer Island, WA (US); Skyler Fuzell-Casey, Portland, OR (US); Timothy D. Casey, Mercer Island, WA (US); Donald Ryan, Talladega, AL (US)

(73) Assignee: APERTURE INVESTMENTS, LLC, Mercer Island, WA (US)

( * ) Notice: Subject to any disclaimer, the term of this patent is extended or adjusted under 35 U.S.C. 154(b) by 50 days.

(21) Appl. No.: 16/837,796

(22) Filed: Apr. 1, 2020

(65) Prior Publication Data

US 2020/0228596 A1 Jul. 16, 2020

Related U.S. Application Data

(63) Continuation-in-part of application No. 16/292,193, filed on Mar. 4, 2019, now Pat. No. 10,623,480, which is a continuation-in-part of application No. 15/868,902, filed on Jan. 11, 2018, now Pat. No. 10,225,328, which is a continuation-in-part of application No. 14/671,979, filed on Mar. 27, 2015, now Pat. No. 10,242,097, and a continuation-in-part
(Continued)

(51) Int. Cl.
*G06F 16/78* (2019.01)
*H04L 67/10* (2022.01)

(52) U.S. Cl.
CPC ............ *H04L 67/10* (2013.01); *G06F 16/78* (2019.01)

(58) Field of Classification Search
None
See application file for complete search history.

(56) References Cited

U.S. PATENT DOCUMENTS

| 5,561,649 | A | 10/1996 | Lee et al. |
| 6,151,571 | A | 11/2000 | Pertrushin |

(Continued)

OTHER PUBLICATIONS

Www.picitup.com; Picitup's; PicColor product; copyright 2007-2010; accessed Feb. 2, 2015; 1 page.
(Continued)

*Primary Examiner* — Delomia L Gilliard
(74) *Attorney, Agent, or Firm* — BakerHostetler

(57) ABSTRACT

A method for categorizing streamed music based on a sample set of RTP scores for predetermined tracks. High-level acoustic attributes for tracks are determined by an analyzed extraction of low-level data from the tracks. The high-level acoustic attributes are used to develop computer-derived RTP scores for the tracks based on the sample set, which includes RTPs score for a plurality of possible combinations of a rhythm score (R), a texture score (T), and a pitch score (P) respectively from a R range, a T range, and a P range. At least some of the RTP scores correspond to human-determined RTP scores for predetermined tracks among a plurality of predetermined tracks. Each RTP score corresponds to a category among a plurality of categories. The computer-derived RTP scores are used to determine a category for each track among the plurality of categories. Playlists of the tracks are based on one or more of the categories.

34 Claims, 11 Drawing Sheets

Related U.S. Application Data of application No. 14/671,973, filed on Mar. 27, 2015, now Pat. No. 9,875,304, which is a continuation-in-part of application No. 14/603,324, filed on Jan. 22, 2015, now Pat. No. 10,061,476, and a continuation of application No. 14/603,325, filed on Jan. 22, 2015, now abandoned, and a continuation-in-part of application No. 13/828,656, filed on Mar. 14, 2013, now Pat. No. 9,639,871, said application No. 14/603,324 is a continuation-in-part of application No. 13/828,656, filed on Mar. 14, 2013, now Pat. No. 9,639,871.

(60) Provisional application No. 61/971,490, filed on Mar. 27, 2014, provisional application No. 61/930,442, filed on Jan. 22, 2014, provisional application No. 61/930,444, filed on Jan. 22, 2014.

(56) References Cited

U.S. PATENT DOCUMENTS

| | | | |
|---|---|---|---|
| 6,411,289 | B1 | 6/2002 | Zimmerman |
| 6,464,585 | B1 | 10/2002 | Miyamoto et al. |
| 6,539,395 | B1 | 3/2003 | Gjerdingen et al. |
| 6,657,117 | B2 | 12/2003 | Weare et al. |
| 6,748,395 | B1 | 6/2004 | Picker et al. |
| 6,964,023 | B2 | 11/2005 | Maes et al. |
| 6,993,532 | B1 | 1/2006 | Platt et al. |
| 7,022,907 | B2 | 4/2006 | Lu et al. |
| 7,024,424 | B1 | 4/2006 | Platt et al. |
| 7,080,324 | B1 | 7/2006 | Nelson et al. |
| 7,115,808 | B2 | 10/2006 | Lu et al. |
| 7,205,471 | B2 | 4/2007 | Looney et al. |
| 7,206,775 | B2 | 4/2007 | Kaiser et al. |
| 7,227,074 | B2 | 6/2007 | Ball |
| 7,233,684 | B2 | 6/2007 | Fedorovskaya et al. |
| 7,296,031 | B1 | 11/2007 | Platt et al. |
| 7,396,990 | B2 | 7/2008 | Lu et al. |
| 7,424,447 | B2 | 9/2008 | Fuzell-Casey et al. |
| 7,427,708 | B2 | 9/2008 | Ohmura |
| 7,485,796 | B2 | 2/2009 | Myeong et al. |
| 7,541,535 | B2 | 6/2009 | Ball |
| 7,562,032 | B2 | 7/2009 | Abbosh et al. |
| 7,582,823 | B2 | 9/2009 | Kim et al. |
| 7,626,111 | B2 | 12/2009 | Kim et al. |
| 7,756,874 | B2 | 7/2010 | Hoekman et al. |
| 7,765,491 | B1 | 7/2010 | Cotterill |
| 7,786,369 | B2 | 8/2010 | Eom et al. |
| 7,809,793 | B2 | 10/2010 | Kimura et al. |
| 7,822,497 | B2 | 10/2010 | Wang |
| 7,858,868 | B2 | 12/2010 | Kemp et al. |
| 7,921,067 | B2 | 4/2011 | Kemp et al. |
| 8,013,230 | B2 | 9/2011 | Eggink |
| 8,229,935 | B2 | 7/2012 | Lee et al. |
| 8,248,436 | B2 | 8/2012 | Kemp et al. |
| 8,260,778 | B2 | 9/2012 | Ghatak |
| 8,269,093 | B2 | 9/2012 | Naik et al. |
| 8,346,801 | B2 | 1/2013 | Hagg et al. |
| 8,354,579 | B2 | 1/2013 | Park et al. |
| 8,390,439 | B2 | 3/2013 | Cruz-Hernandez et al. |
| 8,407,224 | B2 | 3/2013 | Bach et al. |
| 8,410,347 | B2 | 4/2013 | Kim et al. |
| 8,505,056 | B2 | 8/2013 | Cannistraro et al. |
| 8,686,270 | B2 | 4/2014 | Eggink et al. |
| 8,688,699 | B2 | 4/2014 | Eggink et al. |
| 8,855,798 | B2 | 10/2014 | Dimaria et al. |
| 8,965,766 | B1 | 2/2015 | Weinstein et al. |
| 9,165,255 | B1 | 10/2015 | Shetty et al. |
| 9,195,649 | B2 | 11/2015 | Neuhasuer et al. |
| 9,788,777 | B1 | 10/2017 | Knight et al. |
| 9,830,896 | B2 | 11/2017 | Wang et al. |
| 9,842,146 | B2 | 12/2017 | Chen et al. |
| 2003/0045953 | A1 | 3/2003 | Weare et al. |
| 2003/0133700 | A1 | 7/2003 | Uehara et al. |
| 2003/0221541 | A1 | 12/2003 | Platt et al. |
| 2005/0065781 | A1 | 3/2005 | Tell et al. |
| 2005/0109194 | A1 | 5/2005 | Gayama et al. |
| 2005/0109195 | A1 | 5/2005 | Haruyama et al. |
| 2005/0211071 | A1 | 9/2005 | Lu et al. |
| 2005/0234366 | A1 | 10/2005 | Heinz et al. |
| 2005/0241465 | A1 | 11/2005 | Goto et al. |
| 2005/0252362 | A1 | 11/2005 | McHale |
| 2006/0047649 | A1 | 3/2006 | Liang et al. |
| 2006/0096447 | A1 | 5/2006 | Weare et al. |
| 2006/0143647 | A1 | 6/2006 | Bill et al. |
| 2006/0170945 | A1 | 8/2006 | Bill et al. |
| 2007/0079692 | A1 | 4/2007 | Glatt et al. |
| 2007/0107584 | A1 | 5/2007 | Kim et al. |
| 2007/0113725 | A1 | 5/2007 | Oliver et al. |
| 2007/0113726 | A1 | 5/2007 | Oliver et al. |
| 2007/0131096 | A1 | 6/2007 | Lu et al. |
| 2008/0021851 | A1 | 1/2008 | Alcalde et al. |
| 2008/0040362 | A1 | 2/2008 | Aucouturier et al. |
| 2008/0184167 | A1 | 7/2008 | Berrill et al. |
| 2008/0189754 | A1 | 8/2008 | Yoon et al. |
| 2008/0235284 | A1 | 9/2008 | Aarts et al. |
| 2008/0253695 | A1 | 10/2008 | Sano et al. |
| 2008/0300702 | A1 | 12/2008 | Gomez et al. |
| 2008/0314228 | A1 | 12/2008 | Dreyfuss et al. |
| 2009/0069914 | A1 | 3/2009 | Kemp et al. |
| 2009/0071316 | A1 | 3/2009 | Oppenheimer et al. |
| 2009/0182736 | A1 | 7/2009 | Ghatak et al. |
| 2009/0234888 | A1 | 9/2009 | Holmes et al. |
| 2010/0011388 | A1 | 1/2010 | Bull et al. |
| 2010/0042932 | A1 | 2/2010 | Lehtiniemi et al. |
| 2010/0053168 | A1 | 3/2010 | Kemp et al. |
| 2010/0082627 | A1* | 4/2010 | Lai ............ G06F 16/9535 707/738 |
| 2010/0086204 | A1 | 4/2010 | Lessing et al. |
| 2010/0091138 | A1 | 4/2010 | Nair et al. |
| 2010/0094441 | A1 | 4/2010 | Mochizuki et al. |
| 2010/0223128 | A1 | 9/2010 | Dukellis et al. |
| 2010/0223223 | A1 | 9/2010 | Sandler et al. |
| 2010/0253764 | A1 | 10/2010 | Sim et al. |
| 2010/0260363 | A1 | 10/2010 | Glatt et al. |
| 2010/0325135 | A1 | 12/2010 | Chen et al. |
| 2011/0112671 | A1 | 5/2011 | Weinstein et al. |
| 2011/0184539 | A1 | 7/2011 | Agevik et al. |
| 2011/0191674 | A1 | 8/2011 | Rawley et al. |
| 2011/0202567 | A1 | 8/2011 | Bach et al. |
| 2011/0239137 | A1 | 9/2011 | Bill et al. |
| 2011/0242128 | A1 | 10/2011 | Kang et al. |
| 2011/0252947 | A1 | 10/2011 | Eggink et al. |
| 2011/0252951 | A1 | 10/2011 | Leavitt et al. |
| 2011/0271187 | A1 | 11/2011 | Sullivan et al. |
| 2011/0289075 | A1 | 11/2011 | Nelson et al. |
| 2011/0314039 | A1 | 12/2011 | Zheleva et al. |
| 2012/0090446 | A1 | 4/2012 | Moreno et al. |
| 2012/0132057 | A1 | 5/2012 | Kristensen et al. |
| 2012/0172059 | A1 | 7/2012 | Kim et al. |
| 2012/0179693 | A1 | 7/2012 | Knight et al. |
| 2012/0179757 | A1 | 7/2012 | Jones et al. |
| 2012/0197897 | A1 | 8/2012 | Knight et al. |
| 2012/0226706 | A1 | 9/2012 | Choi et al. |
| 2012/0260789 | A1 | 10/2012 | Ur et al. |
| 2012/0272185 | A1 | 10/2012 | Dodson et al. |
| 2012/0296908 | A1 | 11/2012 | Bach et al. |
| 2013/0032023 | A1 | 2/2013 | Pulley et al. |
| 2013/0086519 | A1 | 4/2013 | Fino et al. |
| 2013/0138684 | A1 | 5/2013 | Kim et al. |
| 2013/0167029 | A1 | 6/2013 | Friesen et al. |
| 2013/0173526 | A1 | 7/2013 | Wong et al. |
| 2013/0178962 | A1 | 7/2013 | DiMaria et al. |
| 2013/0204878 | A1 | 8/2013 | Kim et al. |
| 2013/0205223 | A1 | 8/2013 | Gilbert et al. |
| 2013/0247078 | A1 | 9/2013 | Nikankin et al. |
| 2014/0052731 | A1 | 2/2014 | Dahule et al. |
| 2014/0053710 | A1 | 2/2014 | Serletic, II |
| 2014/0053711 | A1 | 2/2014 | Serletic, II |
| 2014/0080606 | A1 | 3/2014 | Gillet et al. |
| 2014/0085181 | A1 | 3/2014 | Roseway et al. |
| 2014/0094156 | A1 | 4/2014 | Uusitalo et al. |
| 2014/0140536 | A1 | 5/2014 | Serletic, II |
| 2014/0180673 | A1 | 6/2014 | Neuhauser et al. |

(56) References Cited

U.S. PATENT DOCUMENTS

| | | |
|---|---|---|
| 2014/0282237 A1 | 9/2014 | Fuzell-Casey et al. |
| 2014/0310011 A1 | 10/2014 | Biswas et al. |
| 2014/0372080 A1 | 12/2014 | Chu |
| 2015/0078583 A1 | 3/2015 | Ball et al. |
| 2015/0081064 A1 | 3/2015 | Ball et al. |
| 2015/0081065 A1 | 3/2015 | Ball et al. |
| 2015/0081613 A1 | 3/2015 | Ball et al. |
| 2015/0134654 A1 | 5/2015 | Fuzell-Casey |
| 2015/0179156 A1 | 6/2015 | Uemura et al. |
| 2015/0205864 A1 | 7/2015 | Fuzell-Casey et al. |
| 2015/0220633 A1 | 8/2015 | Fuzell-Casey et al. |
| 2015/0269307 A1* | 9/2015 | Pal ............... G16B 5/20 506/2 |
| 2016/0110884 A1 | 4/2016 | Fuzell-Casey et al. |
| 2016/0125863 A1 | 5/2016 | Henderson |
| 2016/0139241 A1* | 5/2016 | Holz ............... H04B 17/318 367/128 |
| 2016/0188981 A1* | 6/2016 | Doerring ........ G06F 16/7834 382/190 |
| 2016/0203805 A1 | 7/2016 | Strachan |
| 2016/0267637 A1* | 9/2016 | Hsiao ............. G06F 16/5854 |
| 2016/0329043 A1 | 11/2016 | Kim et al. |
| 2016/0337426 A1* | 11/2016 | Shribman ........ H04L 65/608 |
| 2016/0372096 A1 | 12/2016 | Lyske |
| 2017/0091983 A1 | 3/2017 | Sebastian et al. |
| 2017/0103740 A1 | 4/2017 | Hwang et al. |
| 2017/0206875 A1 | 7/2017 | Hwang et al. |
| 2017/0330540 A1 | 11/2017 | Quattro et al. |
| 2018/0033416 A1 | 2/2018 | Neuhasuer et al. |
| 2018/0047372 A1 | 2/2018 | Scallie et al. |
| 2018/0049688 A1 | 2/2018 | Knight et al. |
| 2018/0053261 A1 | 2/2018 | Hershey |
| 2018/0139268 A1 | 5/2018 | Fuzell-Casey et al. |
| 2019/0238952 A1* | 8/2019 | Boskovich ........ H04N 21/8133 |

OTHER PUBLICATIONS http://labs.tineye.com; Multicolor; Idee Inc.; copyright 2015; accessed Feb. 2, 2015, 1 page.

http://statisticbrain.com/attention-span-statistics/; Statistics Brain; Statistic Brain Research Institute; accessed Feb. 2, 2015; 4 pages.

Dukette et al.; "The Essential 20: Twenty Components of an Excellent Health Care Team"; RoseDog Books; 2009; p. 72-73.

Music Genome Project; http://en.wikipedia.org/wiki/Music.sub.--Genome.sub.--Project; accessed Apr. 15, 2015; 4 pages.

Ke et al.; "Computer Vision for Music Identification"; In Proceedings of Computer Vision and Pattern Recognition; 2005; vol. 1; p. 597-604.

Lalinsky; "How does Chromaprint work?"; https://oxygene.sk/2011/01/how-does-chromaprint-work; Jan. 18, 2011; accessed Apr. 15, 2015; 3 pages.

Gforce; http://www.soundspectrum.com; copyright 2015; accessed Apr. 15, 2015; 2 pages.

Harlan J. Brothers; "Intervallic Scaling in the Bach Cello Suites"; Fractals; vol. 17 Issue 4; Dec. 2009; p. 537-545.

Ke et al.; "Computer Vision for Music Identification"; IEEE Computer Vision and Pattern Recognition CVPR; Jun. 2005; 8 pages.

* cited by examiner

MANIC
5, 4, 3
4, 4, 2
4, 5, 3
4, 4, 3
4, 5, 2

HAPPY
3, 4, 4
3, 3, 5
3, 5, 5
3, 3, 4

EXCITED
2, 4, 4
3, 4, 3
3, 5, 3
2, 2, 4

CAUTIOUS
(E/P/S)
2, 4, 2
3, 4, 2
3, 3, 2
3, 3, 3
2, 3, 3

PEACEFUL
3, 2, 3
2, 2, 3
3, 2, 2
4, 2, 1
1, 1, 3

SAD
1, 2, 1
2, 3, 1
1, 1, 2
3, 5, 2
2, 2, 2

FIG. 7

STREAMING MUSIC CATEGORIZATION USING RHYTHM, TEXTURE AND PITCH

CROSS-REFERENCE TO RELATED APPLICATIONS

This application is a continuation-in-part of U.S. patent application Ser. No. 16/292,193, filed Mar. 4, 2019, now U.S. Pat. No. 10,623,480; which is a continuation-in-part of U.S. patent application Ser. No. 15/868,902, filed Jan. 11, 2018, now U.S. Pat. No. 10,225,328 issued Mar. 5, 2019; which is a continuation-in-part of U.S. patent application Ser. No. 14/671,973, filed Mar. 27, 2015, now U.S. Pat. No. 9,875,304, issued Jan. 23, 2018; which is a continuation-in-part of U.S. patent application Ser. No. 14/603,324, filed Jan. 22, 2015, now U.S. Pat. No. 10,061,476, issued Aug. 28, 2018; and a continuation of U.S. patent application Ser. No. 14/603,325, filed Jan. 22, 2015; both of which are continuation-in-parts of U.S. patent application Ser. No. 13/828,656, filed Mar. 14, 2013, now U.S. Pat. No. 9,639,871, issued May 2, 2017; the entire contents of each of which are incorporated herein by reference.

U.S. patent application Ser. Nos. 14/603,324 and 14/603,325 both claim benefit under 35 U.S.C. § 119(e) of Provisional U.S. Patent Application No. 61/930,442, filed Jan. 22, 2014, and of Provisional U.S. Patent Application No. 61/930,444, filed Jan. 22, 2014, the entire contents of each of which are incorporated herein by reference.

U.S. patent application Ser. No. 14/671,973 also claims benefit under 35 U.S.C. § 119(e) of Provisional Application No. 61/971,490, filed Mar. 27, 2014, the entire contents of which are incorporated herein by reference.

U.S. patent application Ser. No. 15/868,902 is also a continuation-in-part of U.S. patent application Ser. No. 14/671,979, filed Mar. 27, 2015, now U.S. Pat. No. 10,242,097, issued Mar. 26, 2019, the entire contents of which are incorporated herein by reference.

TECHNICAL FIELD

The present disclosure relates to music categorization and selection.

BACKGROUND

A recorded music track, called a "track" herein, has a beginning and an end, regardless of its length, its type, whether it is entirely instrumental, vocal or a combination of both, and regardless of whether it is part of a collection of tracks, such as an album, or by itself, a single. Traditional music selections systems, such as APPPLE ITUNES, tend to rely on music types, such as style and genre and other factors, such as, performer(s), decade, etc., to enable users to browse through vast libraries of music and make selections to, listen, rent, buy, etc. For example, in such music selection systems, the music is often organized by the genre, style or type of music, i.e., jazz, classical, hip hop, rock and roll, electronic, etc., and within such genres, the music may be further classified by the artist, author, record label, era (i.e., 50's rock), etc.

Some music selection systems will also make recommendations for music based on user preferences and other factors. Pandora Media, Inc.'s PANDORA radio system, for example, allows users to pick music based on genre and artists, and will then recommend additional tracks the user may be interested in listening to based on the user's own previous indications, which are identified by an identification system. This identification system is derived from the Music Genome Project. While the full details of the Music Genome Project do not appear to be publicly available, certain unverified information about it is available on-line. For example, Wikipedia states that the Music Genome Project uses over 450 different musical attributes, combined into larger groups called focus traits, to make these recommendations. There are alleged to be thousands of focus traits, including rhythm syncopation, key tonality, vocal harmonies, and displayed instrumental proficiency. See, http://en.wikipedia.org/wiki/Music_Genome_Project (accessed Jan. 27, 2019).

According to this Wikipedia article, each track is represented by a vector (a list of attributes) containing up to 450 or more attributes or "genes," as noted above. Each gene corresponds to a characteristic of the music, for example, gender of lead vocalist, level of distortion on the electric guitar, type of background vocals, etc. Different genres of music will typically have different sets of genes, e.g., 150 genes for some types of music, 350 to 400 genes for other types, and as many as 450 genes for some forms of classical music. Each gene is assigned a number between 0 and 5, in half-integer increments. The assignment of gene values is performed by humans in a process that takes 20 to 30 minutes per track. Some percentage of the tracks is further analyzed by other humans to ensure conformity. Distance functions are used to develop lists of tracks related to a selected track based on the vector assigned to the selected track.

While the Music Genome Project represents an ambitious and detailed identification system, it suffers from many shortcomings as a result of its inherent complexity. The most significant of these deficiencies is that it often recommends tracks, as being similar to other tracks, but listeners of those tracks are not capable of identifying why those tracks were determined to be similar. For example, PANDORA and SPOTIFY, another music selection system, allows users to select a "radio" that may be based on the music by a particular artist, such as Madonna Radio, a particular album, a playlist created by someone else or other choices. Such radio stations will initially primarily play music based on the initial user selection, but over time add in a variety of other artists, often called "recommendations," that the selection system considers to be similar based on some proprietary recommendation algorithm.

Many radio listeners find, however, that regardless of the initial selection, within a relatively short period of time, such as an hour, the music selection will go off in disparate directions, often ending up with holiday music and other types of music that are not remotely related to the initial selection. To help prevent this, users may use thumbs up and thumbs down buttons or love and skip buttons while playing different tracks to partly train the recommendation algorithm. The thumbs down or skip button will allow a track playing to be skipped. This only works, however, if the user is extremely diligent about using the buttons and makes no mistakes, i.e., hitting thumbs up or love when not intended will fairly quickly take the radio station in an unwanted direction. The selection systems also tend to limit how often the thumbs down or skip buttons can be used, thereby making it impossible to effectively ban a particular artist or type of music from being included at some point in time.

SPOTIFY will also enable users to create their own playlist from scratch, share them with others, or listen to playlists created by others. Based on listening habits, such as tracks that have been liked, shared, saved, and skipped, the service will also create playlists for a user. Some playlists are categorized into genres and/or moods. The genre data may be based on metadata associated with each track. Subjectively selected moods may also be included in metadata or later created based on a person's determination of what might constitute a mood and whether a track corresponds to such a mood.

SUMMARY

A method for categorizing streamed music based on a sample set of RTP scores for predetermined tracks. High-level acoustic attributes for tracks are determined by an analyzed extraction of low-level data from the tracks. The high-level acoustic attributes may be derived from a music service that streams music. The high-level acoustic attributes may be used to develop computer-derived RTP scores for the tracks based on the sample set, which includes RTP scores for a plurality of possible combinations of a rhythm score (R), a texture score (T), and a pitch score (P) respectively from a R range, a T range, and a P range. At least some of the RTP scores correspond to human-determined RTP scores for predetermined tracks among a plurality of predetermined tracks. Each RTP score corresponds to a category among a plurality of categories. The computer-derived RTP scores are used to determine a category for each track among the plurality of categories. Playlists of the tracks are based on one or more of the categories.

BRIEF DESCRTPTION OF THE DRAWINGS

Throughout the drawings, reference numbers may be re-used to indicate correspondence between referenced elements. The drawings are provided to illustrate examples described herein and are not intended to limit the scope of the disclosure.

FIG. 7 is an illustration of RTP scores for a larger group of tracks objectively scored by RTP and clustered into one of a plurality of mood classes by the identification system.

DETAILED DESCRTPTION OF ILLUSTRATIVE EMBODIMENTS

Embodiments of the present disclosure are primarily directed to music categorization and playlist creation. In particular, embodiments involve a music categorization system that objectively categories music based on rhythm, texture and pitch (RTP) values or scores, from which the mood or some other category of the music may be determined and used to create playlists.

With respect to mood, when someone listens to a track, the track tends to evoke some emotion. This may be because of some personal connection a user has to the track, such as memories or experiences related to the track, but may also be because of the track's inherent qualities. Since those inherent qualities may be represented by frequency-related data (i.e., frequencies, structure and organization), that frequency-related data may be used to identify those inherent qualities. The present disclosure describes how spectrograms, whether based on chromagrams or using other forms of spectrograms, and other data may be used to objectively determine the inherent qualities of RTP, which may then be subjectively or objectively mapped to moods to identify tracks in a new manner.

Figure 1:
FIG. 1 illustrates an audio file represented as a waveform.

Values for RTP may be determined holistically, based on low-level data extracted from the music, or high-level data constructed or derived from the low-level data. An example of a holistic method for determining RTP is as follows. All music can be identified by its frequency-related data. Perhaps the simplest way of doing so is illustrated in FIG. 1, where a track is represented by a one-dimensional (1-D) waveform that illustrates changes in amplitude in the track over time. While such a waveform can be somewhat distinctive of the track represented, the amount of information conveyed by the small distortions in the waveform is limited, making it difficult for any person or machine evaluating the waveform to extract much in the way of perceptual information. If that track evoked a mood in someone listening to the track, the 1-D waveform does little to represent the characteristics of the track that evoke that mood. Many other forms of low-level and high-level data may be used to create 1-D representations of a track.

Figure 2:
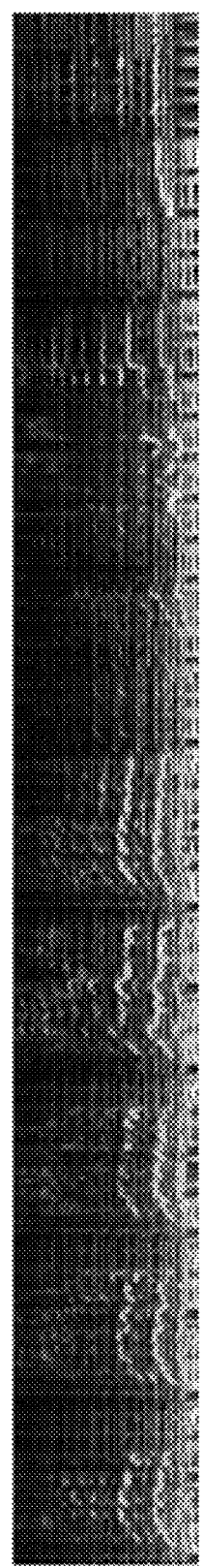
FIG. 2 illustrates an audio file represented as a spectrogram.

Accordingly, audio spectrograms based on a short-term Fourier transform, such as represented in FIG. 2, have been developed to provide a more complete and precise extracted representations of a track. The spectrogram is a two-dimensional (2-D) representation of the intensity of frequency over time, like a waveform, but it provides more accurate extracted representation of the track because the spectrogram shows changes in intensity at specific frequencies, much like a musical score. The 2-D spectrogram shows more visual distinctions (than does the 1-D waveform) based on signal differences due to different audio sources, such as different voices and different types of instruments being played.

While the spectrogram visually represents some similarities and differences in the music, the time-domain signal representation makes the process of comparing spectrograms using correlation slow and inaccurate. One solution proposed for analyzing the characteristics of spectrogram images is disclosed by Y. Ke, D. Hoiem, and R. Sukthankar, *Computer Vision for Music Identification*, In Proceedings of Computer Vision and Pattern Recognition, 2005. In this paper, the authors propose determining these characteristics based on: "(a) differences of power in neighboring frequency bands at a particular time; (b) differences of power across time within a particular frequency band; (c) shifts in dominant frequency over time; (d) peaks of power across frequencies at a particular time; and (e) peaks of power across time within a particular frequency band." Different filters are used to isolate these characteristics from the audio data. If the audio data is formatted in a particular music format, such as MP3, WAV, FLAC, etc., the compressed audio data would first be uncompressed before creating the spectrogram and applying the filters.

Another solution for analyzing spectrograms extracted from audio files in this fashion is the CHROMAPRINT audio fingerprint used by the ACOUSTID database. CHROMAPRINT converts input audio at a sampling rate of 11025 Hz and a frame size of 4096 (0.371 s) with 2/3 overlap. CHROMAPRINT then processes the converted data by transforming the frequencies into musical notes, represented by 12 bins, one for each note, called "chroma features." After some filtering and normalization, an image like that illustrated in FIG. 3 may be generated.

Another extraction solution converts each audio file into mel-spectrograms, representing multiple audio features extracted from each one second (a predetermined period) of each audio file, that are then input to the WOLFRAM Language-based AUDIOIDENTIFY trained neural network. This neural network was trained on the GOOGLE released AudioSet dataset, an expanding ontology of 632 audio event classes and large-scale collection of 2,084,320 human-labeled 10-second sound clips drawn from YouTube videos. With overlap, the audio classes include 1,011,949 music clips, 1,010,480 speech clips, 117,384 musical instrument clips, 44,565 plucked string instrument clips, 42,493 singing clips, 28,125 violin/fiddle clips, 20,246 drum clips, and a wide range of other musical instruments and sounds, animal sounds and common everyday environmental sounds. In an embodiment, desired layers from this pre-trained network may then be extracted to generate a vector of audio features for each predetermined period. In an embodiment, the vector may include 1280 features for each one second of input audio. If a track is 3½ minutes long, 215,880 data samples may be taken and used for analytics, which may be an overwhelming amount of data. In an embodiment, VGGish, released by GOOGLE in 2017, may be used to extract 128-dimensional embeddings from each one second of input audio to generate the vectors of audio features. In an embodiment, a smaller amount of features may be extracted, such as 102 audio features/second, without resulting in a significant drop in analysis quality.

The resultant classification neural network may utilize a recurrent layer that works better with audio file inputs of varying length, versus a linear neural network that requires fixed-dimension inputs. This selection may also enable the entire audio file (the whole song) to be analyzed versus fixed set partitions or randomly generated chunks.

Figure 3:
FIG. 3 illustrates a visual representation of chroma features in an audio file.

While the audio representations, chromagrams or mel-spectrograms, of FIG. 3 are robust and may be used for other purposes herein, they do not lend themselves well to visual comparative analysis and need to be further compacted to be useful in that regard, which is where the characteristic filters noted above may come into play. There are a number of ways in which chromagrams may be filtered. For example, first, the image of FIG. 3 may be scanned from left to right, one pixel at a time, in grayscale, to create a large number of subimages. Then, the characteristic filters may be applied to the subimages to capture intensity differences over time in the musical notes represented by the subimages. Each filter may calculate the sum of specific areas of the subimages, compare the sums, and arrange the areas in one of six ways, as illustrated in FIG. 4.

Figure 4:
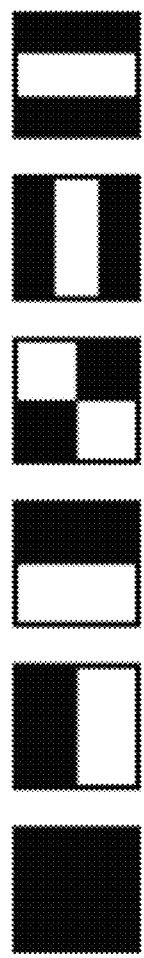
FIG. 4 illustrates subimage filters for filtering the visual representation of FIG. 3 in order to generate an audio fingerprint.
Figure 5:
FIG. 5 illustrates an audio fingerprint.

The arrangement of filter images from FIG. 4 may be placed over the subimages, adjusted in size (as long as the filter images fit within the pixel size of the subimage), and the resulting black and white areas may be processed to derive a single real number representing the arrangement. Every characteristic filter may have one or more coefficients associated with it that specify the rules for quantizing the real number so the final result is an integer between 0 and 3.

CHROMAPRINT uses 16 filters that can each produce an integer that can be encoded into 2 bits. When these are combined, the result is a 32-bit integer. This same process may be repeated for every subimage generated from the scanned image, resulting in an audio fingerprint, such as that illustrated in FIG. 5. The above discussion of spectrograms, chromagrams, and audio fingerprints as well as the images of FIG. 1, FIG. 2, FIG. 3, FIG. 4, and FIG. 5 are based on https://oxygene.sk/2011/01/how-does-chromaprint-work/.

Filtering and comparative analysis is not required in all embodiments. Once an audio classification, either through the neural network analysis or audio fingerprint analysis, has been determined for a track having known RTP scores determined through other means (such as a human listener, a spectrum analyzer, or other electrical measurement tool), that audio classification may be compared to other audio classification having unknown RTP scores to see if matches can be found. Matches may include any corresponding tracks having the same or very similar RTP scores. If there are no matches, then further comparisons may need to be run until the unknown RTP scores in the audio classification have been identified. Although this holistic approach might involve a human listening to the music to determine known RTP scores corresponding to a sufficient number of tracks for comparative purposes, the approach is still much more efficient than the existing technique of relying on humans to listen to every track.

Figure 6:
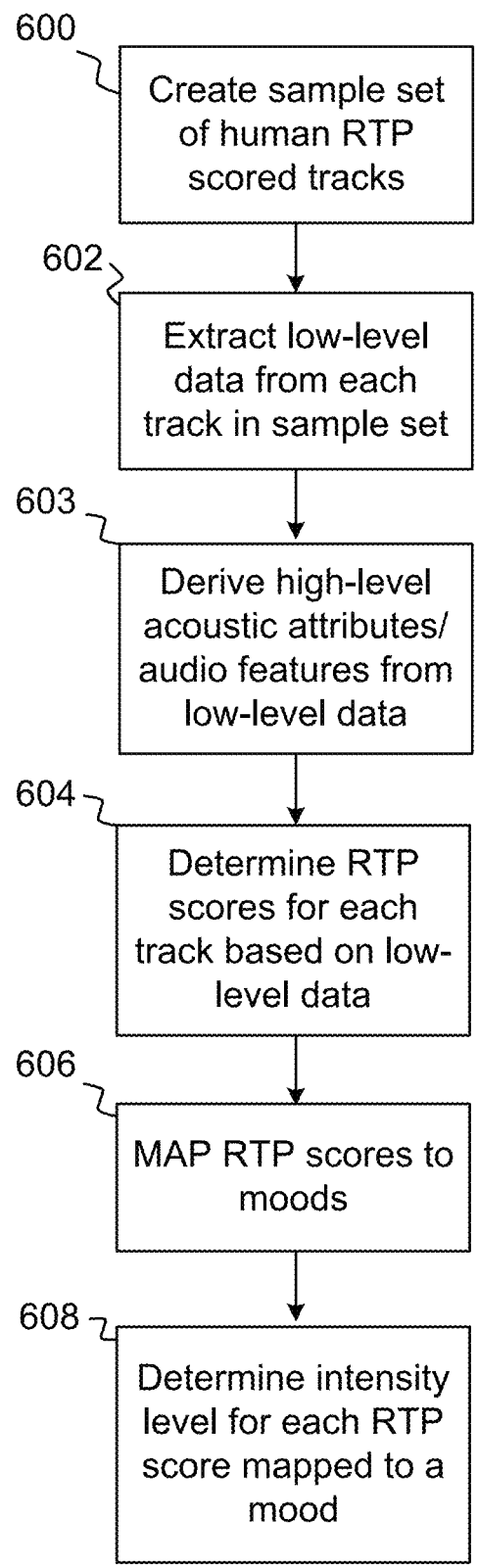
FIG. 6 is a flow chart illustrating how tracks are sampled, low-level data is extracted and RTP scores are determined and mapped to moods, possibly with intensity levels.

In an embodiment based on the audio classifications, as illustrated in FIG. 6, tracks sufficient to create a sample set may be listened to by humans to develop RTP scores that correspond to each track (step 600). Those tracks may then be sampled, step 602, by a music data extractor, such as any of those described herein. The low-level extracted data may include acoustic descriptors characterizing loudness, dynamic complexity, spectral shapes, barkbands, melbands, Equivalent Rectangular Bandwidth (ERB) bands, etc., rhythm descriptors characterizing beats per minute (BPM), BPM histograms, onset rates, etc., and tonal descriptors characterizing keys, chords, scales, etc. The low-level data may then be analyzed, step 603, to derive high-level acoustic attributes or audio features based on the low-level data, and may be further analyzed, step 604, to determine further high-level data, such as rhythm, texture and pitch. The RTP data may be represented in different forms. In an embodiment, the RTP scores are represented on a half-point scale ranging from 1 to 5.

In an embodiment, a greedy algorithm may analyze all of the low-level data extracted from each track in the sample set and all of the high-level data extracted therefrom to determine which low-level data and high-level data contributes to correct solutions for RTP scores of each track, based on the known RTP scores. The greedy algorithm may operate by sorting through the low-level data and high-level data to select the best data candidates for solving for correct RTP scores for each track. Each best candidate may then be analyzed to determine if the candidate can be used to contribute to the solution. If the candidate can contribute to the solution, a value is assigned to each contributing candidate based on whether it fully or partially solves the solution. If there is no candidate that provides a full solution (as is almost always the case), a collection of contributing candidates is identified that either provides a complete solution or gets closest to the complete solution.

In an embodiment, the following low-level data may form a collection of contribution candidates for a solution for rhythm (R):
1. Beats per minute histogram and highest peak, spread of the first peak, first peak weight, and first peak beats per minute.
2. Energy (magnitude) in a frequency band.
3. Energy in one or more ERB bands of the spectrum and values of crest (ratio between the maximum value and the arithmetic mean) and flatness (ratio between the geometric mean and the arithmetic mean converted to db scale).
4. Weighted mean of frequencies as a measure of the spectral centroid, where the magnitude of the frequencies are the weights.
5. Skewness of the $0^{th}$, $1^{st}$, $2^{nd}$, $3^{rd}$ and $4^{th}$ central moments.
6. Minimum zero-crossing rate.
7. Mel-frequency cepstrum coefficients (MFCCs).
8. High frequency content.
9. Estimation of silence in a frame.

In an embodiment, the following low-level data may form a collection of contribution candidates for a solution for texture (T):
1. Shannon entropy (quantification of diversity).
2. Beats per minute histogram and mean of first peak spread and second beak beats per minute.
3. Energy in one or more Bark bands of the spectrum and values of crest (ratio between the maximum value and the arithmetic mean) and flatness (ratio between the geometric mean and the arithmetic mean converted to db scale).
4. MFCCs.
5. Spectral kurtosis and energy.
6. Beat energy within the whole spectrum.

In an embodiment, the following low-level data may form a collection of contribution candidates for a solution for pitch (Pt):
1. Weighted mean of frequencies as a measure of the spectral centroid, where the magnitude of the frequencies are the weights.
2. Shannon entropy (quantification of diversity).
3. Beats per minute histogram and first peak weight.
4. High frequency content.
5. Energy in ERB bands of the spectrum and values of flatness.
6. Spectral energy.

Different low-level data extractors may extract different data from the spectrograms than that indicated above. In such a case, the greedy algorithm may identify different low-level data that forms the collection of candidates for a solution to either R, T or P. High-level data extracted from the low-level data may be identified in a similar manner as described herein.

In an embodiment, rather than use a greedy algorithm, the extracted low-level data for each track may be converted to MFCCs (Mel-frequency cepstral coefficients) as an encoding step and then input into an artificial neural network. The layers of the neural network may extract data from the MFCCs for each track and combine that MFCC data with other data to identify an RTP score for each track, wherein the identification is based on the neural net being trained with known associations between MFCCs and RTP scores. The other data may include audio data augmentation, which may overcome problems associated with data scarcity and otherwise improve recognition performance. Audio data augmentation involves the creation of new synthetic training samples based on small perturbations in a training sample set to fill in gaps in the training data. A sufficiently large set of tracks with known RrP scores and other data, such as the audio data augmentation, may lead to a neural network sufficiently trained to determine unknown RTP scores for tracks with reasonably sufficient accuracy.

As noted above. RTP scores in an embodiment may range from 1 to 5 on a half point scale, i.e., 1.0, 1.5, 2.0, 2.5, 3.0, 3.5, 4.0, 4.5 and 5.0. As such the RTP scores may constitute a spectrum of scores ranging from (1.0,1.0,1.0) to (5.0,5.0, 5.0). These RTP scores may be grouped in various ways. In an embodiment, such as step 606 of FIG. 6, the RTP scores are grouped based on moods, such as happy, excited, manic, peaceful, sad and cautious, where cautious may be further separated into cautious/excited, cautious/peaceful and cautious/sad, and where sad may represent RTP scores with lower values and manic may represent RTP scores with higher values. For example, RTP (1.0,1.0,1.0) may correspond to sad and RTP (5.0,5.0,5.0) may correspond to manic.

The moods identified above are just examples and other words representing other moods may be utilized instead, including completely arbitrary words. However, it has been found that the mood conveyed by tracks with RTP scores such as (1.0,2.0,1.0) and (1.0,1.0,2.0) and (2.0,2.0,2.0), are similar and therefor logically map to the same grouping or category of tracks. An example mapping of RTP scores to moods is illustrated in FIG. 7. In this illustration, the spectrum starts at manic, then happy, excited, cautious, peaceful and sad. The RTP to mood mapping illustrated in FIG. 7 is based on a small sample set of tracks based on westernized music, where most of the music is produced using a certain subset of instruments that exist around the world and based on westernized rhythm patterns. A larger sample set may have a different mapping and mood mappings may be preferential depending on a particular application. A sample set of tracks based on music other than westernized music may also have a different RTP to mood mapping as different instruments or different rhythm patterns may be utilized.

For example, a test of thousands of tracks of westernized music resulted in a large number of tracks mapped to the cautious mood, as the RTP scores tend to be in the 2.0, 3.0 and 4.0 ranges that may identify cautious tracks. While such tracks may have cautious elements, they may also exhibit excited, peaceful and sad elements as well. In an embodiment, it may be desirable to divide the cautious mood into three separate moods, such as cautious/excited, cautious/peaceful and cautious/sad.

While the distribution of RTP scores to moods is fairly even as illustrated in FIG. 7, this may not always be the case. In an embodiment in which RTP scores range from 1 to 5 on a half point scale, there are 729 (i.e., $9^3$) possible combinations. If evenly distributed among six moods, each mood would correspond to 121.5 RTP scores, but this is not always the case. For example, in an embodiment, 106 RTP scores may be mapped to cautious/excited, cautious/peaceful and cautious/sad in some further distribution, 131 RTP mapped to excited, 126 RTP scores mapped to happy, 130 RTP scores mapped to manic, 173 RTP scores mapped to peaceful, and 63 RTP mapped to sad. However, many tracks may have similar characteristics that may cause the tracks to be mapped to the same mood, even though there are subtle differences. In such a case, it may be desirable to reduce the number of RTP scores that map to that one mood and map some of the RTP scores in that mood to other moods so that users see some greater variance to the mood mapping. It may also be desirable to increase the number of moods or categories so as to further segment the RTP to mood/category mapping.

Once the RTP scores have been grouped or mapped as desired, the RTP scores within a group may be further refined. For example, when RTP scores are mapped to moods, the RTP scores corresponding to a mood may fall along a spectrum of intensities. For example, RTP (1.0,1.0, 1.0) may be the lowest intensity for sad, while RTP (3.0, 5.0,2.0) may be the highest intensity for sad, with all other RTP scores corresponding to sad falling somewhere in between the lowest and highest RTP scores, Hence, in step 608, the intensity levels for RTP scores within each mood may be determined based on a spectrum or distance factor. Although other spectrums may be utilized, the above example may be used to group tracks corresponding to a mood as low, medium and high intensity (or any other suitable gradation) with respect to that mood, as will be further described below.

The description provided above for determining RTP scores for tracks may be based on averaging, where various averages are used to determine the RTP scores. For example, the entire track may not be sampled to extract the low-level data. Rather, samples may be collected at different times during a track, such as 10 second samples every 10 seconds, or different length samples at fixed or random points during the track. For a track with a consistent rhythm, texture and pitch throughout the entire track, such as Pachelbel's Canon, written somewhere between 1680 and 1706, and considered the godfather of pop music because so much pop music is based on a similar repetition, this form of averaging may be sufficient to generate a singular RTP score that corresponds to the track.

Other tracks may vary significantly throughout, such as starting softly and building up over time until there is a thunderous ending. Other tracks are literally all over the place and may have many different moods each with different intensity levels throughout. Bohemian Rhapsody by Queen, for example, is six minutes long and includes several sections, including an introduction, a ballad segment, an operatic passage, a hard rock part, and a reflective coda. For a track like Bohemian Rhapsody, samples taken during the introduction, the ballad segment, the operatic passage, the hard rock part and the coda may result in completely different RTP scores. In an embodiment, samples may be taken during the entire track or for sufficient lengths of time along a large enough set of points during each track, such that different RTP scores may be determined for different parts of the same track. For example, a track may be 40% manic, 40% sad, and 20% happy, and may have different intensity levels within each of those corresponding moods. In order to simplify the current disclosure, only a single RTP score is determined for each track, but it should be understood that multiple RTP scores may be determined for each track.

Figure 8:
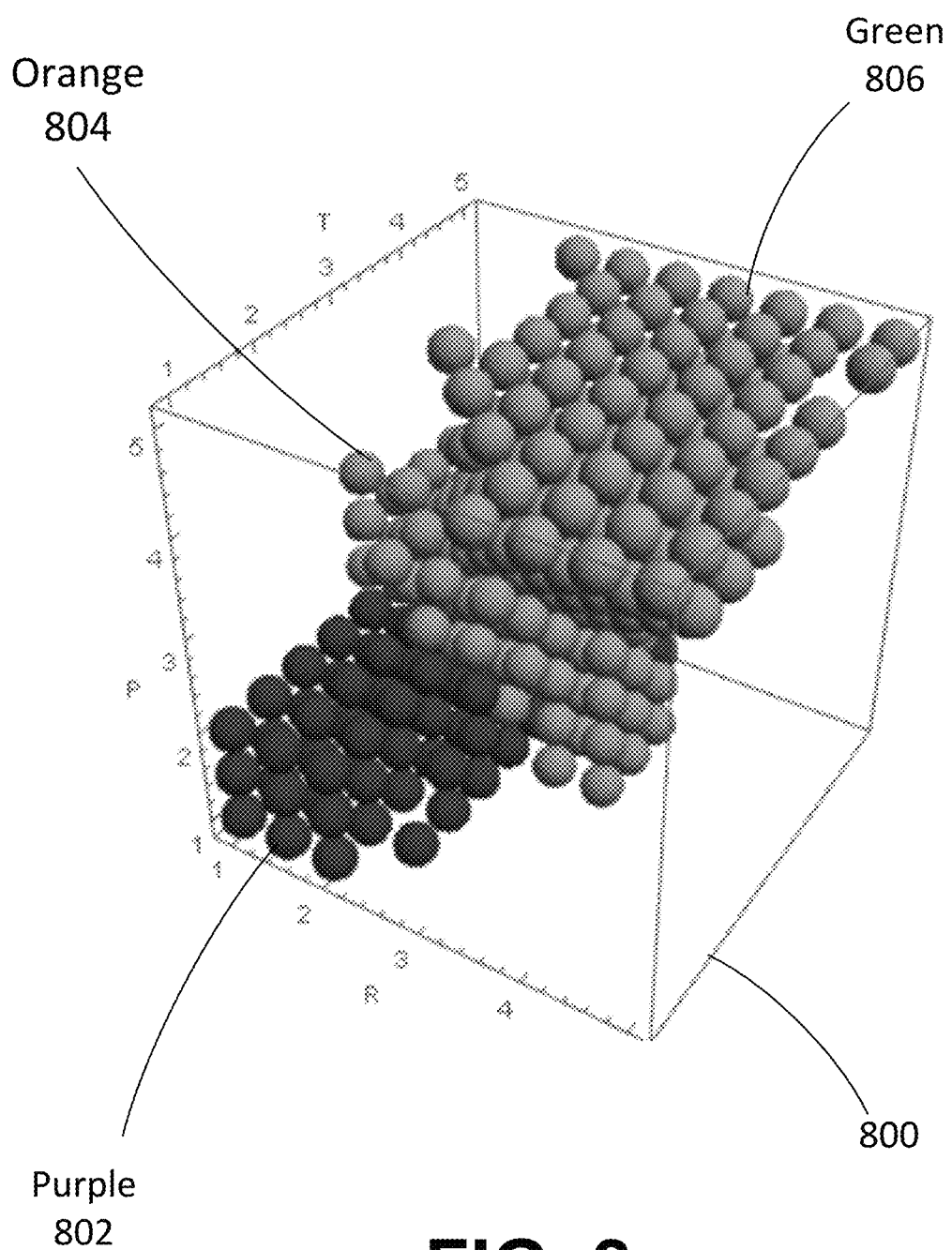
FIG. 8 is an illustration of three-dimensional shapes based on RTP identifying different mood clusters.

RTP scores may also be used to visualize moods to users through both color and shape. In a parent U.S. patent application Ser. No. 15/868,902, embodiments for utilizing color and shape to represent moods were discussed as a further way to verify the mood of a track. The use of RTP scores are accurate enough, however, that validating embodiments may not be required. Nevertheless, shape and color may still be utilized in other ways as futher illustrated in FIG. 8, which shows three different collections of RTP scores corresponding to different moods. The three-dimensional cube 800 illustrates these moods in accordance with their RTP scores, where R is the bottom face of the cube 800, T is the top face of the cube 800 and P is a side face of the cube 800. Each sphere within the three-dimensional cube 800 corresponds to an RTP score. For example, the RTP score (1.0,1.0,1.0) is represented by a sphere within the group of purple spheres 802, corresponding to the sad mood, the RTP score (3.0,3.0,3.0) is represented by a sphere within the group of orange spheres 804, corresponding to one of the cautious moods, and the RTP score (5.0,5.0,5.0) is represented by a sphere within the group of green spheres 806, corresponding to the manic mood. The spheres representing the other moods, e.g., sad, happy, excited and peaceful can be seen in FIG. 13, thereby completely filling the three-dimensional cube 800. As can be seen in FIG. 8, the spheres within each mood may have a color and form a shape representing that mood. The shape and color of each mood may also allow users to visualize the relationship between the moods and their corresponding RTP scores.

Figure 9:
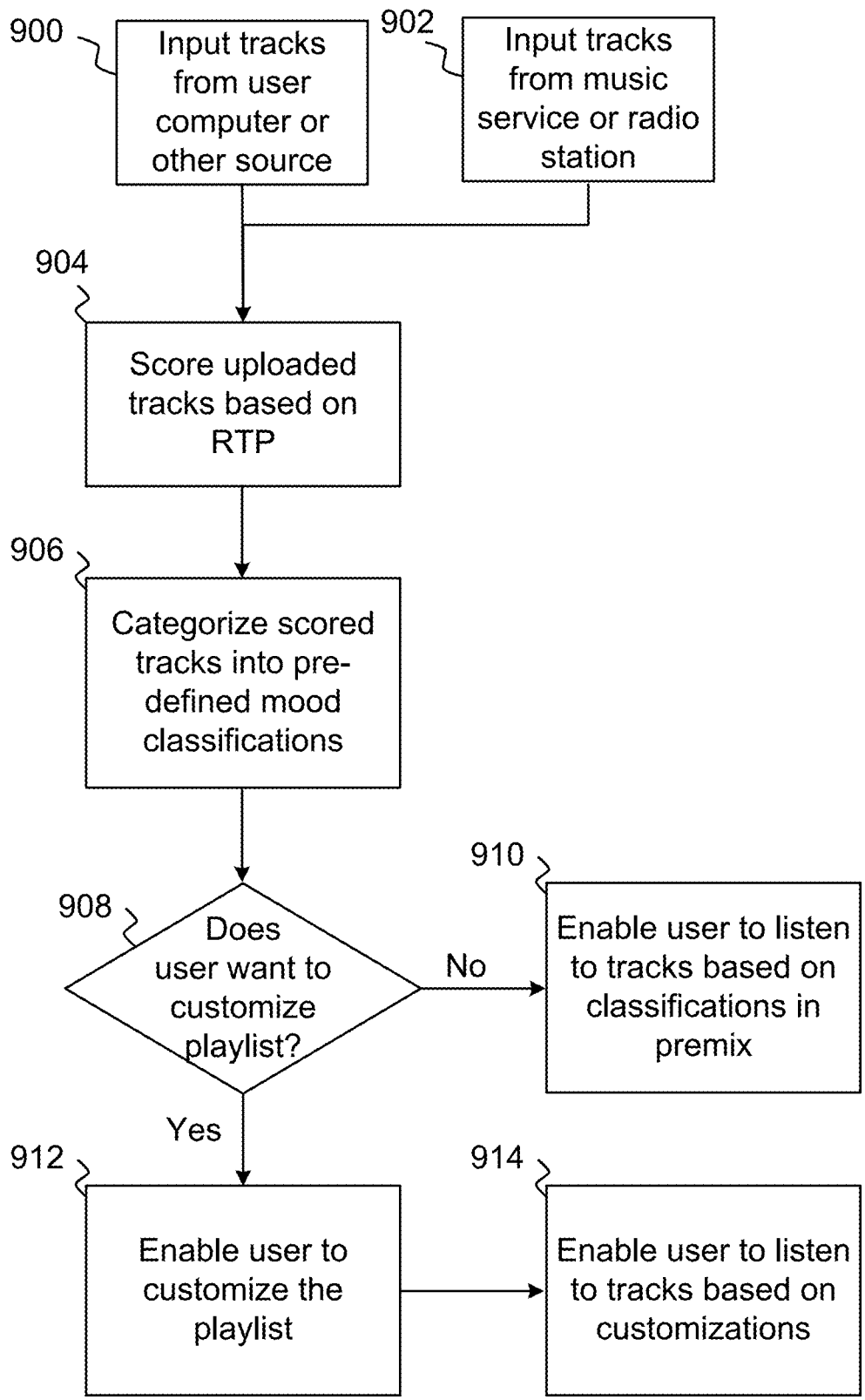
FIG. 9 is a flow chart illustrating the objective scoring of input tracks based on RTP scores, the objective classifying of the scores to cluster the tracks into different categories, various options that may be performed by a user to customize playlists based on the mood classes, and the subsequent utilization of the tracks by the users in accordance with this process.

In an embodiment, as illustrated in FIG. 9, tracks to be RTP scored and mood mapped for a playlist may be accessed by a user in a variety of ways. In an embodiment, a user may first import music from different sources, such as stored audio files locally accessible to the user's client application, step 900. For example, WINDOWS MEDIA PLAYER 12.0 enables a user to rip audio compact discs in a range of kbit/s, compressed, lossless, or uncompressed, with error correction, and in a variety of formats, including MP3, WAV, WMA, FLAC, ALAC. In an embodiment, as further described herein, music and/or data associated with the music may be streamed from a remote location, or a music service, such as ITUNES, SPOTIFY, PANDORA and the like, or a radio station 902 with a collection of music.

Data from locally accessible tracks may be input by sending copies of the tracks to a central server that may determine the RTP scores, but this may be bandwidth intensive and may implicate copyright restrictions. Alternatively, the low-level data may be extracted from the tracks at a client level, such that only low-level analytical data (which is not a copy of the track) may be transported to the central server. Of course, a central server need not be required, as all analysis may be done at a client application but centralizing the analysis function may reduce the need to constantly push out updated versions of the client application. Additional data about each track may also be extracted, such as metadata related to title, artist, album name, genre, decade, duration, etc., and used to identify each track in a user interface.

Once data from the tracks have been input in some manner, the tracks may be analyzed to determine the high-level data and/or the RTP scores, step 904, for the tracks. Once the tracks have been RTP scored, the tracks may be mapped into different mood classifications as noted above, step 906, and as appropriate for the RTP score of the tracks. Once the mood of each track has been determined, users may organize the RTP scored tracks in any manner they choose. If a user has input the tracks from their own computer, they can create playlists on their computer based, at least, on the moods of the tracks. If the tracks have been input from a music service, the user application of the music service, as further described herein, may allow the user to create playlists based on moods and other factors and then have the music service stream the tracks from the user playlist. Likewise, a radio station with a collection of music may allow users to create playlists based on that collection and the moods assigned to the tracks and then listen to the playlist through a user application associate with the radio station.

Figure 10:
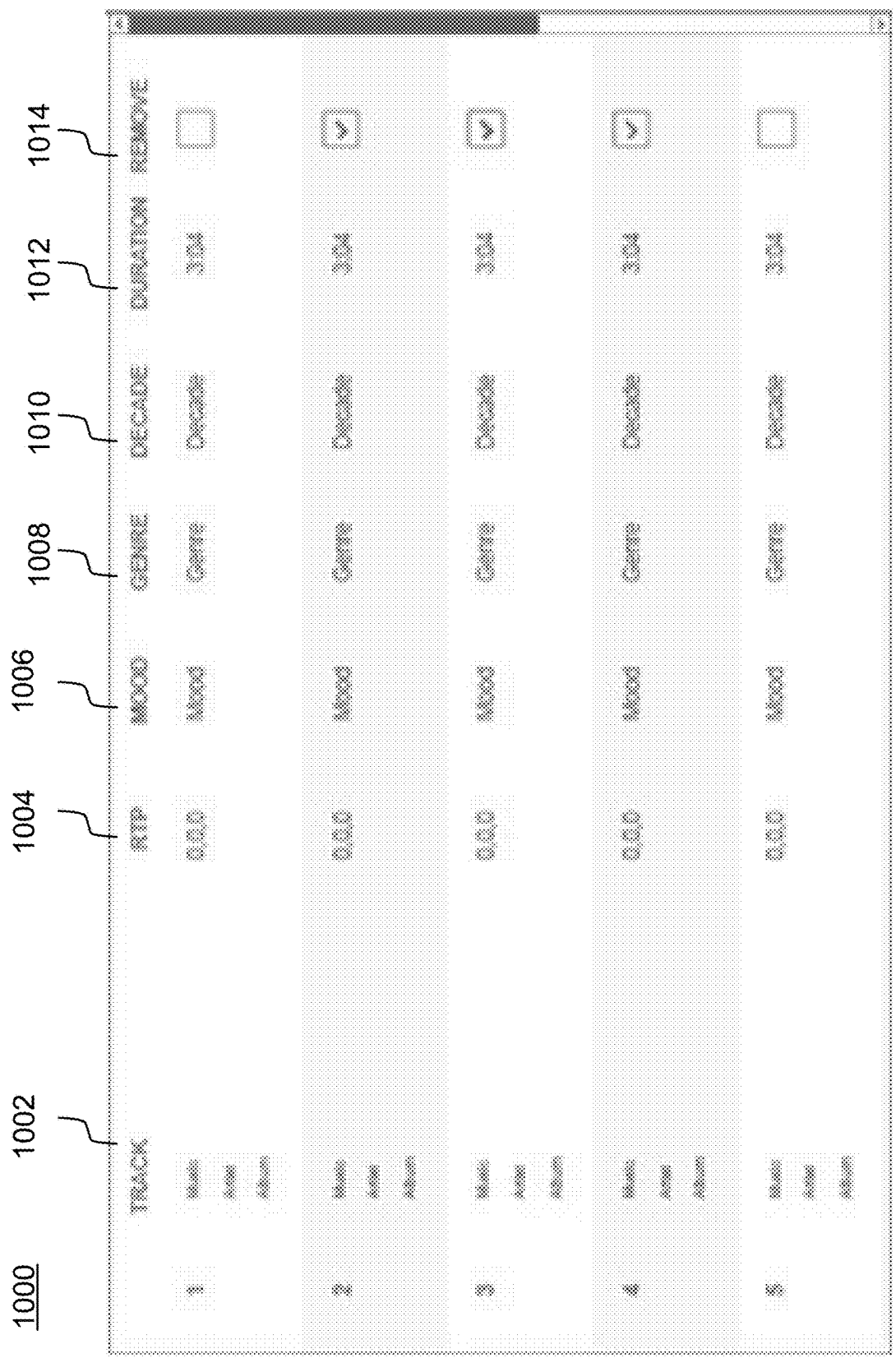
FIG. 10 is an illustration of a user interface for identifying tracks to possibly include in a playlist based on RTP scores, moods and other factors.

In an embodiment, a pre-mix 1000, or list, as illustrated in FIG. 10, of all scored and mood mapped tracks may be generated, step 908. The pre-mix may include information about each track 1002, such as the music title, artist and album, the RTP score 1004, the mood 1006, the genre 1008, the decade 1010, and the duration 1012. The pre-mix 1000 may include all tracks that have been scored and mood mapped, but a user may not wish to use the entire pre-mix 1000 to create a playlist, so a remove selection 1014 allows the user to selectively determine which tracks are not to be used to create a playlist. If the user does not wish to create a customized playlist, the user may listen to the music based on just the pre-mix 1000, step 910. If the user wants to customize a playlist, 912, once the playlist has been customized, the user can listen to the custom playlist, 914.

Figure 11:
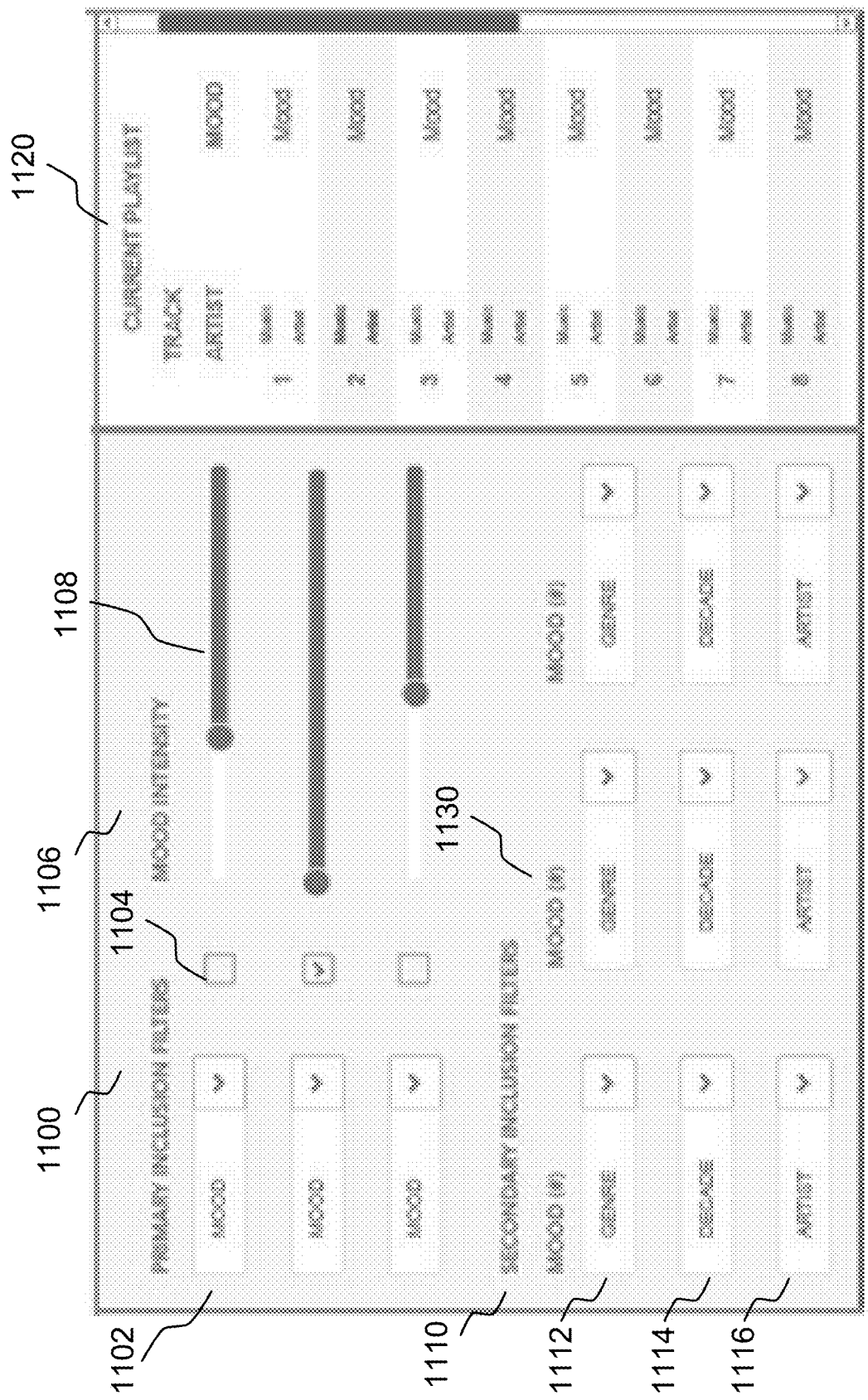
FIG. 11 is an illustration of a user interface with primary filters for filtering the moods in the possible playlist based on intensity and secondary filters for filtering the possible playlist based on genre, decade and artist.

An embodiment for customizing a playlist is illustrated in FIG. 11. Primarily inclusion filters 1100 may be used to select among different moods 1102 corresponding to tracks to be included in a custom playlist. In an embodiment, the user may select a single mood, or multiple moods. In an embodiment, the mood selections may be for any tracks that include even part of that mood, such as a track that is 20% of a certain mood. For each selected mood, the user may choose to include all tracks within that mood by selecting a selection box 1104, or only select tracks based on intensity 1106 level of the mood. If a user desires to filter tracks in a playlist based on intensity, the user may select the handle of the slider 1108 and move the slider to a desired intensity level.

In an embodiment, intensity may be determined by dimensionally plotting the RTP scores for each mood to determine a mid-point, and then determining the distance from the mid-point for each RTP scored corresponding to that mood. With respect to Happy, for example, which is between Manic and Excited, RTP scores that are closer to RTP scores in the Manic mood may be in the higher intensity range of Happy while RTP scores that are closer to RTP scores in the Excited mood may be in the lower intensity range of Happy.

To the degree intensity levels are considered to cover a range, such as 1.0-10.0, with 1.0 being low, 5.0 being medium and 10.0 being high, as further described in the parent applications incorporated by reference herein, the ranges on the slider may correspond to spans within that range so that a user's choice within a range is not too limited. If a user's choice is truly limited to only RTP scored tracks with a high intensity level, the user may find that too few songs are selected for their liking. For this reason, once the user identifies an intensity level, the corresponding span may be purposely designed to be a bit bigger so more tracks will be included. For example, if a user selected an intensity level of 4.0, the span may cover a broader portion of the intensity range, such as 3.5-4.5 or 3.0-5.0, thereby allowing a larger number of tracks to be included with the selection, while still more or less honoring the user's intensity selection. Nevertheless, it may be desirable to allow a user to select the intensity level for a mood by moving a handle from high intensity, which includes just high intensities, to a lower level that includes all intensities above the chosen position of the slider, such as illustrated in FIG. 11. This allows a user to exclude tracks that are not as clearly within a particular mood. For example, if a user only wants really happy tracks, then the user may set the handle at the 7.0 point on the slider so only tracks at 7.0 or above are included. All tracks, regardless of intensity may be included by moving the handle of slider 1108 all the way to the left, which would cause all intensities above the lowest intensity to be included. When this step is performed, the selection box 1104 may automatically be checked by the application to indicate an all intensity selection has been made.

Once the primarily inclusion filters 1100 have been selected, secondary inclusion filters 1110, if desired, may be used to further customize a playlist. For each mood selected in the primary filters 1100, the user may then choose to only include or only exclude tracks with certain characteristics, such as genre 1112, decade 1114 and artist 1116. These characteristics are only exemplary and other characteristics, typically based on metadata associated with each track may also be included. If a user selected genre 1112 for a first mood, the user may be able to filter the playlist to include tracks that are of a certain genre, or exclude such tracks, such as include jazz, but exclude country. Likewise, a user could further filter by decade 1114, so as to exclude 1980's music but include 2000's music. Artists 1116 could also be included or excluded.

The current playlist 1120 is initially populated with the pre-list 1000, less any tracks selected for removal 1014. As the primary inclusion filter 1100 selections are made, the current playlist 1120 is updated based on the selections. For example, if a single mood 1102 is selected, the playlist 1120 will be updated to just include tracks with that single mood. If the intensity for that mood is selected so that some tracks are excluded, the current playlist will be further updated. At the same time, parenthetical number 1130 behind each mood listed in the secondary inclusion filters 1110 will indicate the number of tracks corresponding to selected mood represented in the current playlist 1120. For example, if Mood 1 is selected in the primary inclusion filters 1100, the number 1130 may initially indicate 50 tracks having Mood 1 are included in the current playlist 1120. If the handle for the mood intensity slider 1108 for Mood 1 is moved near the middle of the slider, the number 1130 may be adjusted to 35 tracks. The user may then select only certain genres 1112, decades 1114 and artists 1116 to include in the current playlist 1120, which may cause the number 1130 to be further reduced to 20 tracks. Additional moods may be included and for each mood, additional mood intensity and secondary inclusion filter selections may be made, with the number 1130 being adjusted in each case and the current playlist 1120 being further updated. Once the filtering has been completed, the user may then listen to the customized playlist 914.

Figure 12:
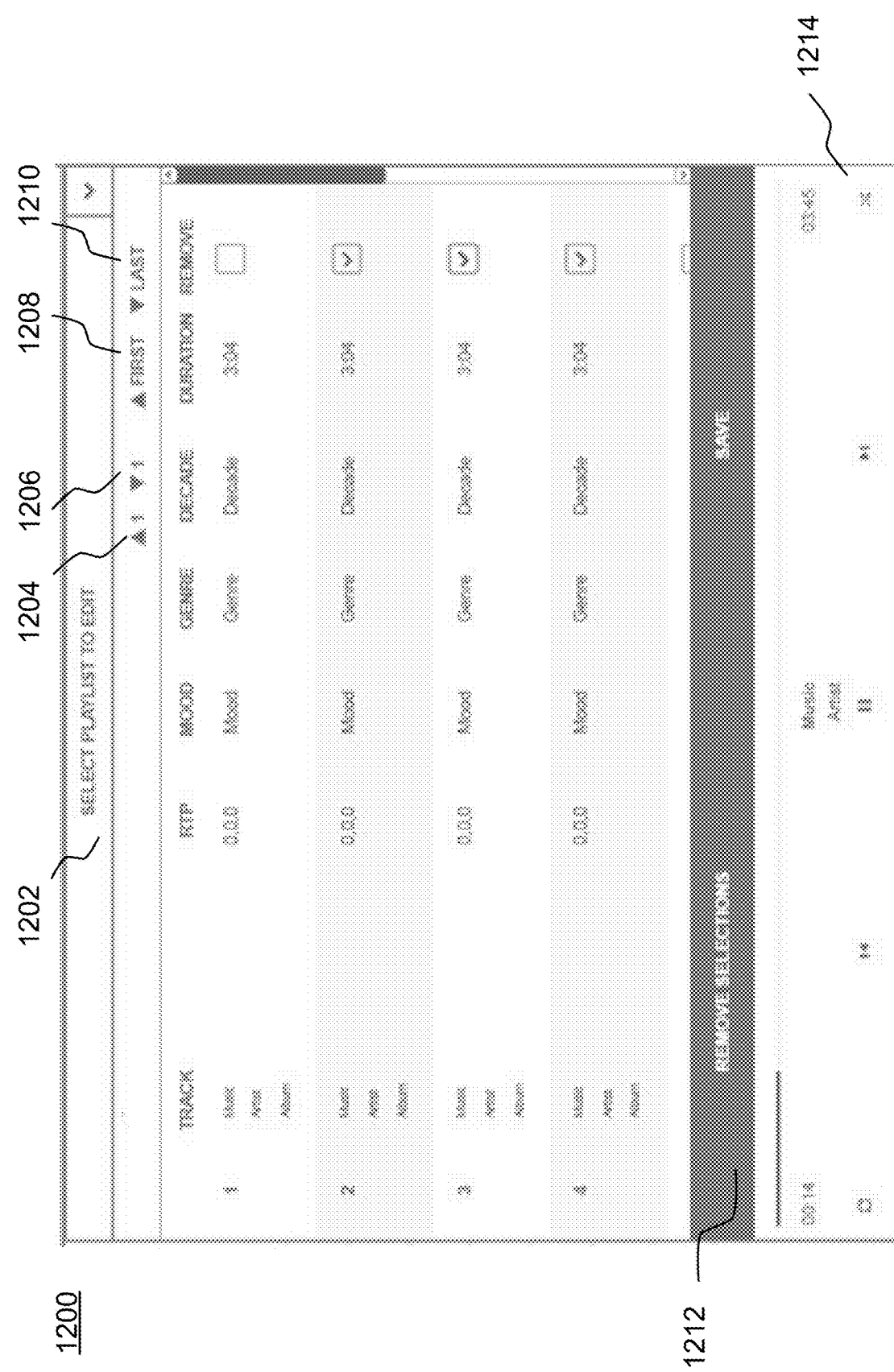
FIG. 12 is an illustration of a user interface for editing playlists once they have been created.

Once a custom playlist has been created, it can then be edited 1200 as further illustrated in FIG. 12, a playlist may be selected from a dropdown menu 1202. Once the playlist has loaded, different tracks can be selected, and the playlist can be moved through one track at a time either up one track 1204 or down one track 1206 or the playlist can be moved to the first track 1208 or the last track 1210. Tracks can then be removed as desired by checking a track for removal and then using remove selections 1212 to remove those tracks. Although tracks could also be added in an embodiment, that is not shown. Once the playlist has been edited, it can be saved. Tracks and the playlist can also be played with the player 1214.

As the RTP to mood mapping involves some objective determination, i.e., identifying which RTP scores map to which mood and/or the name of the mood or category, some users may feel that certain tracks are assigned to the wrong mood and/or the mood is incorrectly identified. For this reason, users may be given the ability to change the moods assigned to certain RTP scores or to group tracks into their own categories and to name those categories as they choose. If a user does not want to customize any aspect of a mood for a track, then the user may be able to just listen to the tracks as classified, step 910. Alternatively, if the user wants to customize the moods or categorize the tracks based on moods, they may do so, step 912. In an embodiment, the user may want to categorize tracks with the same mood or perhaps different moods within a single category that they name themselves, such as "Sunday Listening," which includes a grouping of tracks with different moods that a user likes to listen to on Sundays, step 914. Users may also be able to change the names of the moods from Manic, Happy, Excited, Cautious E/P/S, Peaceful and Sad to whatever words they want. Hence, RTP to mood mapping may be more about RTP to category mapping, with the user having the ability to identify what the category is to be called.

Figure 13:
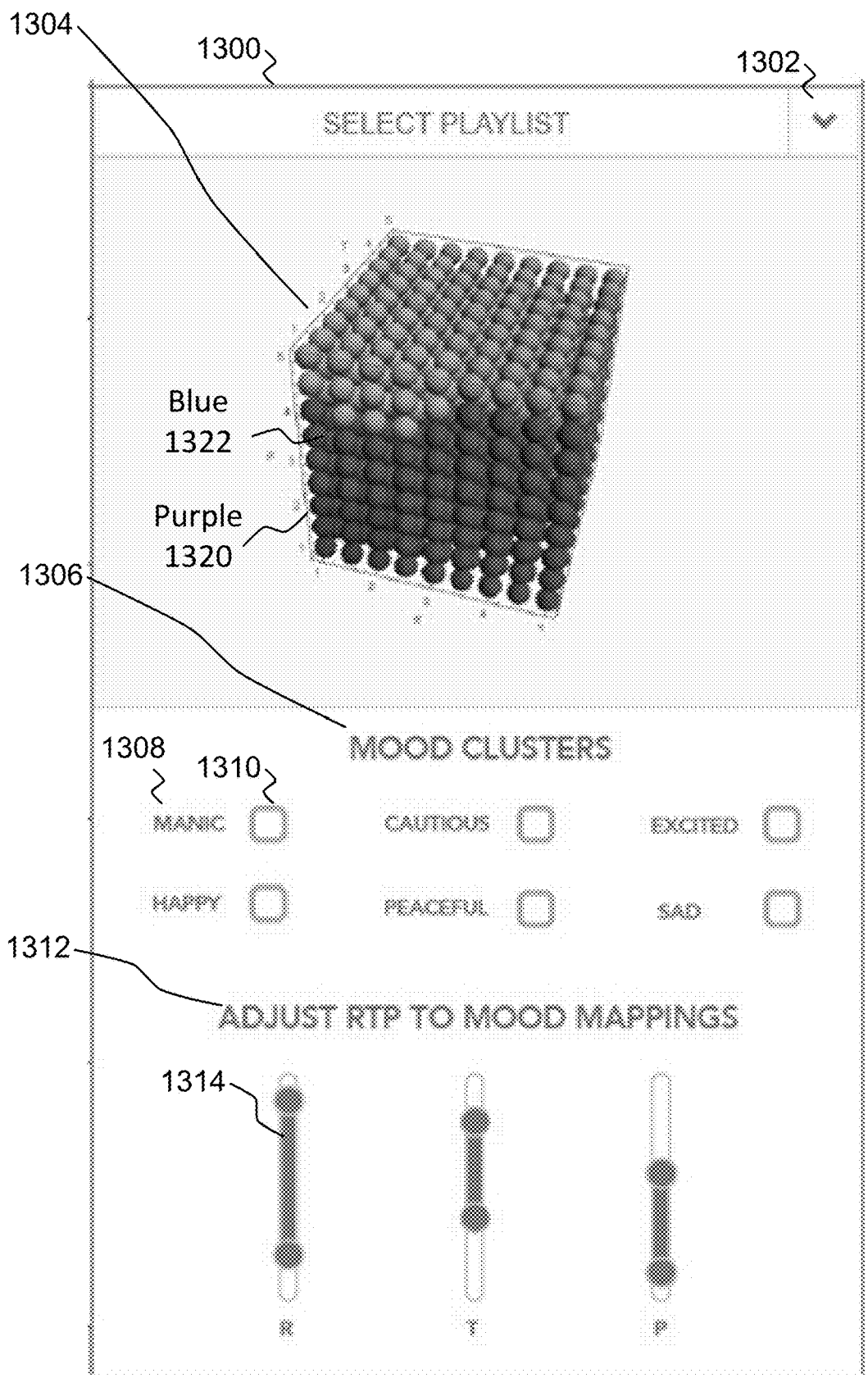
FIG. 13 is an illustration of a user interface for modifying RTP to category mappings.

In an embodiment, a customization of the RTP to mood mapping may be performed as illustrated in FIG. 13. A user may select an existing playlist 1300 from the dropdown menu 1302. Once the playlist 1300 has been selected, the three-dimensional cube 1304 may be illustrated. The cube 1304 illustrates all 729 RTP scores as different colored or shaded spheres. Unless the RTP scores to mood mappings for the cube 1304 have already been customized, the arrangement of the spheres may be based on a default mood mapping.

To customize the RTP to mood mappings, the user may select or deselect one of the different mood clusters 1306 illustrated in the cube 1304. In an embodiment, the cube 1304 may be designed to not show any mood clusters 1306 until the user selects a mood 1308 by checking one of the boxes 1310 corresponding to a mood. Once a box 1310 was selected, the mood cluster of spheres corresponding to that mood might be shown in the cube 1304. In another embodiment, as shown in FIG. 13, all of the mood clusters 1306 may be shown by default. A user may then select the boxes 1310 for mood clusters that the user does not want shown. For example, by selecting the boxes 1310 for manic, happy, cautious E/P/S, peaceful and excited, only the mood cluster 1306 for sad may be shown, which corresponds to the mood cluster 1306 of spheres shown in the bottom left corner of the cube 1304.

In an embodiment, once a single mood has been selected for customization, the user may adjust the RTP to mood mappings 1312 through use of the sliders 1314. Each of the sliders 1314 corresponds to R, T and P, with two handles, illustrated by the darkened circles and a darkened area between the handles representing the range of R, T or P scores for the corresponding mood cluster 1306 illustrated in the cube 1304. As shown in FIG. 13, since all of the mood clusters 1306 are shown in the cube 1304, the handles of the sliders should be at 1 (the lowest possible RTP score) and 5 (the highest RTP score) and the entire slider should be darkened as all RTP scores are currently represented. However, for purposes of illustration only, the sliders 1314 show how the sliders might look if only a single mood cluster 1306 was selected and that mood cluster corresponded to R scores ranging from 2 to 4.5, T scores ranging from 2.5 to 4 and P scores ranging from 1.5 to 3.

To customize the RTP to mood mappings for that mood cluster, the user may then select one of the handles on the sliders 1314 and move it up or down. In an embodiment, by selecting the upper handle on the R slider 1314, the user may move the handle up to 5 such that R now covered the range of 2 to 5. As the sliders 1314 are manipulated for one mood cluster 1306, the spheres corresponding to that mood cluster and any other mood cluster with an impacted RTP score may likewise change. For example, as illustrated in FIG. 13, the RTP score spheres for the purple mood cluster 1320 may represent a P range of 1 to 2 and the RTP score spheres from the blue mood cluster 1322 may represent a P range of 2.5 to 4. Of course, each of the mood clusters 1320 and 1322 may have P ranges different from these based on RTP score spheres that are not visible in cube 1304, so this is just a simplified explanation. Given this simplified explanation, if the slider 1314 from the purple mood cluster 1320 was moved from 1-2 to 1-2.5, one of the RTP score spheres in the blue mood cluster 1320 would become part of purple mood cluster 1320 instead. As there must always be 729 RTP score spheres, any change adding or subtracting a RTP score sphere from one mood cluster must add or subtract that RTP score sphere from another mood cluster.

In an embodiment, the user may be able to simply click and drag each sphere, or multiple spheres, in the cube 1304 to move the sphere(s) from one mood cluster to another. Spheres may not be drug out of the cube 1304 so all RTP scores are represented by a mood cluster. As a sphere is moved from one mood cluster to another, the master RTP to mood mapping used by the application would be updated to reflect the change. This direct visual approach might make it easier for users to distribute RTP scores to mood clusters as desired.

Once a user has customized the mood clusters for a particular playlist, the user may be able to save the playlist with the customizations. A save function is not illustrated, but would be known to one of ordinary skill in the art. In a similar manner, all of the playlists may be modified one by one, or a user may be able to customize all playlists at one time. If a user was unhappy with customization that the user had made to any playlist, the user could make further changes in that manner described above or return to the default settings by selecting a return to default settings button (not shown).

Figure 14:
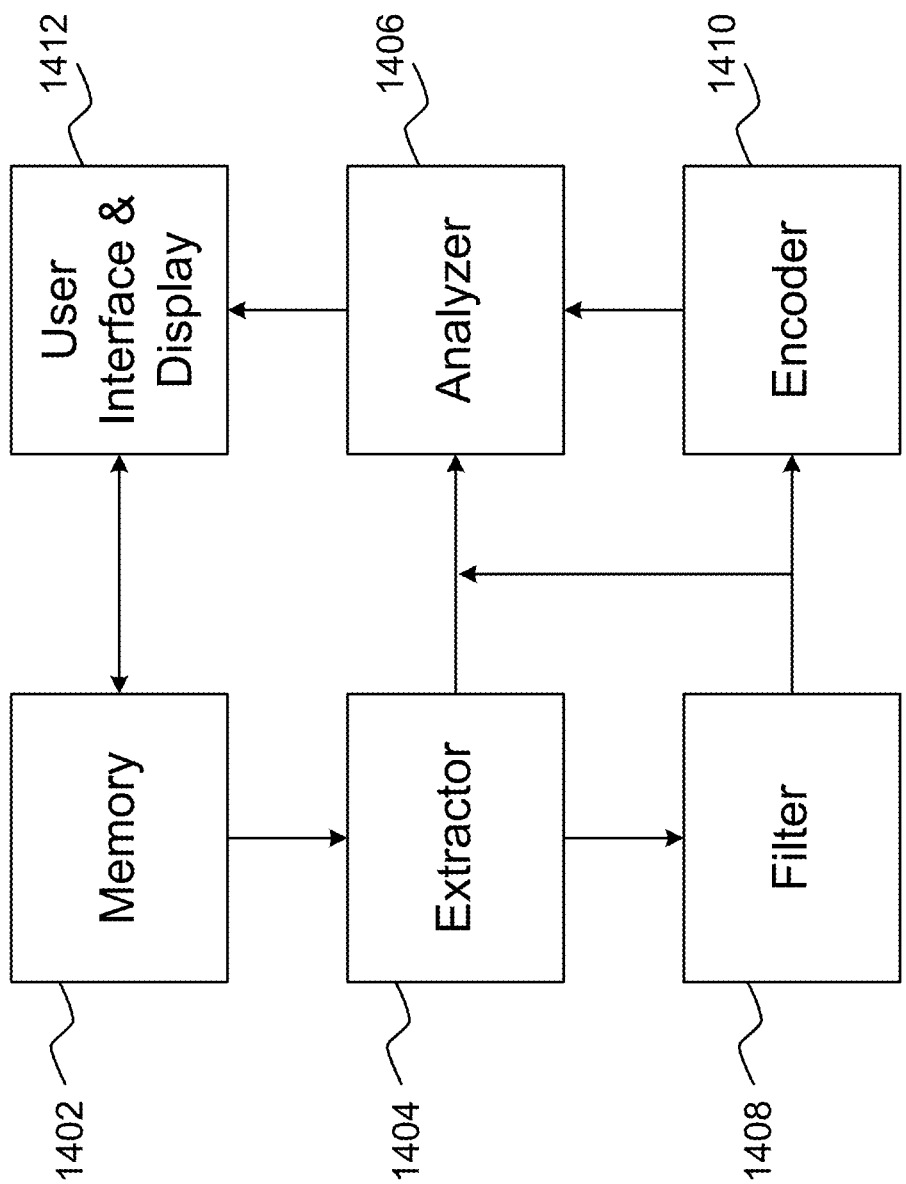
FIG. 14 is a block diagram illustrating a computing system for implementing the techniques described herein.

A block diagram of a music categorization system based on accessible stored tracks in view of the above disclosure is illustrated in FIG. 14. A memory 1402 stores a plurality of content. The data, such as frequency data, in that content may then be read and/or sampled by the extractor 1404 on a periodic basis to extract low-level spectral or other data from each track until all of the content in the memory 1402 has been sampled, which may then be updated from time to time with new content sampled by the extractor 1404 as the new content is added. After extraction, the analyzer 1406 may generate high-level representations of the tracks, such as RTP scores.

In an embodiment, the analyzer 1406 may be utilized to generate static representation of the track based on the low-level sampled frequency data, which may be a static visual representation, such as a spectrogram or mel-spectrogram. The static visual representation may then be filtered by the filter 1408 to capture intensity differences or other differences represented in the static visual representation and to generate a filtered representation of the content. An encoder 1410 may then encode the filtered representation and create digitized representations of the content based on the encoded filtered representation, such as an audio classification. Alternatively, the analyzer 1406 may utilize the spectrograms in a neural network to determine RTP scores as described herein. The analyzer 1406 may operate in conjunction with the user interface and display 1412 to generate imagery for display to a user over a display and to receive commands and input from the user.

In an embodiment, before a track is processed to extract the low-level data and perform other processing, a music identification code may be obtained from the metadata file associated with the music, such as the international standard recording code (ISRC), a Shazam code, MusicBrainz Identifier (MBID), or similar code. Each music identification code uniquely identifies the track and may also be used to identify other information about a track, such as an artist name, releases, recordings, etc. In an embodiment, a database is maintained of RTP scores determined for known music identification codes. A lookup may first be performed, prior to extracting data from a track to determine in an RTP score already exists for the track, in which case the RTP score may be provided without performing any further analysis.

Music services that stream music to users through applications and web browsers may have access to millions of tracks, far more than any single user is likely to have locally in memory, or even a radio station or some other content entity. However, this doesn't mean that users are actually exposed to all of the music because many music services use curated playlists that only make use of a small portion of the licensed tracks. It would therefore be highly desirable to music labels if users of music services had a way to be exposed to more of their licensed tracks and could curate their own playlists. While music services give users the ability to make rudimentary playlists, such as based on listening habits or pure self-curation, users would be exposed to many more tracks, and a greater diversity of tracks, if they were able to assemble playlists based on moods or other categories, each of which might include any artist, in any genre, during any decade. One difficulty in this regard is that music services typically use proprietary formatting when steaming music to users that prevent the users from storing the streamed music. This may also prevent an application, such as that so far described herein, from being able to generate the low-level data necessary and/or high-level data to determine the RTP scores of each track.

In order to attract more users to a particular music service, a service may offer a development platform that encourages the development of applications that make use of various aspects of the music service. The development platform may include an application programming interface (API) that allows a user application to make calls through the API to the music service and get certain data returned to the user application. Such data may include audio analysis data for specific tracks available for streaming through the music service. The audio analysis data may include high-level acoustic attributes or audio features that are derived from low-level data extracted from each track. The API may also make it possible for user applications to cause the music service to stream tracks through the application or other devices capable of playing music, including a window of a computer browser.

The nature of the audio analysis data may vary from music service to music service and may not correspond to the low-level data accessed from stored tracks on a user's computer as otherwise discussed herein, but rather varying forms of high-level data that is based on that low-level data. The audio features or acoustic attributes may also include a music service's version of rhythm, pitch and texture (which may also be called timbre), which may be similar to but deviate from, how RTP is otherwise determined herein. For example, one music service may determine rhythm in a simplistic manner by dividing a track into bars, then further dividing the bars into beats, and then further dividing the beats into tatums and utilizing that information, plus the location of a downbeat, the acceleration/deceleration of components of the track, etc., to determine a time signature. The time signature may then be assigned a number within a range and a confidence value. If the confidence value is low, the time signature score may be discarded because no periodicity was detected.

One music service's version of pitch may be determined by a chroma vector that corresponds to each of the 12 pitch classes. The values assigned to each pitch class may depend on the relative dominance of every pitch in the chromatic scale. A pure tone representing a single pitch may have a value near a whole number, such as 1, for that one pitch, with the other 11 pitches having values near 0. A cord represented by three pitches, may have a value near 1 for each of the three pitches in the cord and values near 0 for the other pitches. Noisy sounds may have a number of pitches with values near 1.

One music service may describe texture as the quality of a musical note or the sound by which one type of musical instrument or voice is distinguished from others. A vector may also be used to represent a number of values based on spectro-temporal surfaces of a track that are independent of pitch and loudness. In such as case, the music service may use high-level abstractions of the spectral surface, ordered by degree of importance, and weighted by coefficient values, to represent texture.

The music service may then use this data and/or other data to come up with a number of audio features, such as how acoustic a certain track may be (i.e., it's acoustic qualities or acousticness) and how danceable a track may be to a human (i.e., its danceable qualities or danceability), which may consider musical elements such as tempo, rhythm stability, beat strength and overall regularity. Other audio features may include energy, which may be a perceptual measure of intensity and activity, typically based on dynamic range, perceived loudness, onset rate and general entropy. Additional audio feature may include instrumentalness, key, liveness, loudness, mode, speechiness, tempo, time signature and valence.

Instrumentalness may be an indication of whether a track contains vocals. The closer an instrumentalness value gets to 1, the more likely the track is an instrumental track. Key may be an indication of what key a track is in, such as C, C #$D_b$, etc., based on pitch class notation, with each key assigned a different integer, such C=0, C #/$D_b$=1, D=2, etc.

Liveness may be an indication of the sound presence of a live audience during a recording, such as a live performance, or background human voices. The higher a liveness value, the more likely a track was performed live. Loudness may be the quality of a sound measured in decibels and may be averaged across an entire track. Mode may indicate the modality of a track, such as whether it is in a major or minor key, i.e., the type of scale from which its melodic content is derived. A 1 may be used to represent major and a 0 to represent minor.

Speechiness may indicate the presence of spoken words in a track, such as an audio book, a poetry reading, a talk show, etc. The closer the speechiness value may be to 1, the more likely a track is made entirely of spoken words, while the closer a track gets to 0 the more likely the track is music or other non-speech tracks. Tempo may be the speed or pace of a given track and may be based on an overall estimated tempo (average beats per minute) of the track. Time signature may be an estimated overall time signature or meter of a track specified by the number of beats in each bar or measure. Valence may describe the musical positiveness, or lack thereof, conveyed by a track. A track with a high valence sound have more of a positive aspect, potentially indicative of happy and excited, and a track with a low valence sound have more of a negative aspect, potentially indicative of sad or manic.

To the degree a music service does not provide RTP scores for a track, it may be possible to develop RTP scores for a track based on the audio analysis data that is provided. In an embodiment, a rhythm (R) score may be based on time signature, danceability, energy, tempo and loudness, a texture (T) score may be based on acousticness, instrumentalness, energy, liveness and speechiness, and a pitch (P) score may be based on key, mode, valence and speechiness.

In an embodiment, the amount by which audio analysis data contributes to R, T and P may be based on known RTP scores for tracks. For example, known R scores, which may be human created R scores or determined using one of the neural network techniques described above, such as using low-level audio data and converting that MFCC data as input for the neural network, may be compared to computed R scores based on different combinations of audio analysis data for the same tracks. In an embodiment, in order to determine the one combination of audio analysis data that generates computed R scores closest to the known R scores for the same tracks, the audio analysis data for each track may be used to both train an algorithm and classify tracks. If, for example, there are known R scores for 100 tracks (or 1,000/10,000/100,000/etc. tracks), a one-dimensional vector may be used to represent each of the 12 different types of audio analysis data.

Each of the one-dimensional vectors may be combined with other one-dimensional vectors to create multi-dimensional vectors representing a combination of audio analysis data. For example, the combination of time signature, danceability, energy and tempo may form a 4-dimensional vector. That same 4-dimensional vector may be computed for each of the 100 tracks, then some portion (perhaps 80%) of the 4-dimensional vectors may be used to train an algorithm, such as a neural network, support vector machine, etc., and the 20 remaining 4-dimensional vectors may be used as experimental data for the trained algorithm.

The R score generated as a result for each track may then be compared to the known R score for each track. The vectors may then be scrambled so that a different combination is used to train the algorithm and tried again. This may be repeated over a number of times, for each track and each combination until one combination emerges that produces a computed R score closest to the known R score for the largest number of the 100 tracks. A similar process may then be repeated for the T score and the P score. Each of the computed R, T and P scores may then be combined to create an RTP score for each track as set forth in step 904 of FIG. 9.

Once tracks have been RTP scored, the tracks may be categorized (e.g., mood mapped), and playlist may be created in the same manner as discussed with respect to FIG. 9. If the tracks have come from a music service in the form of a playlist, it may be possible to make the tracks available through the music service so that they are available to others as well and can be listened to by the user through the music service. The music service may also enable the user to add label art to the playlist and/or tracks in the playlist, reorder the tracks in the playlist and do other things that are permitted through that service.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

In an embodiment, method for categorizing music tracks, may comprise: creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined music track among a plurality of predetermined tracks, each RTP score corresponding to a category among a plurality of categories; extracting low-level data from each track among a plurality of tracks to be RTP scored; analyzing the low-level data to develop a plurality of high-level acoustic attributes for each track among the plurality of tracks; analyzing the high-level acoustic attributes to develop computer-derived RTP scores for each track among the plurality of tracks based on the sample set, each computer-derived RTP score corresponding to one RTP score in the sample set; utilizing the computer-derived RTP scores for each track to determine a corresponding category for each track among the plurality of categories; and creating a playlist based on tracks corresponding to one or more categories among the plurality of categories.

In an embodiment, a method may comprise: determining high-level acoustic attributes for a music track through an analyzed extraction of low-level data from the track; analyzing the high-level acoustic attributes to develop a computer-derived RTP score for the track based on a sample set, the computer-derived RTP score corresponding to one RTP score in the sample set, wherein the sample set includes a RTP score for a plurality of possible combinations of a rhythm score (R), a texture score (T), and a pitch score (P) respectively from a R range, a T range, and a P range, wherein at least some of which RTP scores each correspond to a human-determined RTP score for a predetermined track among a plurality of predetermined tracks, and wherein each RTP score corresponding to a category among a plurality of categories; utilizing the computer-derived RTP score to determine a corresponding category for the track among the plurality of categories; and including the track in a playlist based on one or more categories among the plurality of categories.

In the embodiment, wherein the high-level acoustic attributes used to develop the R score for each track includes a defined rhythm by a music service, wherein the high-level acoustic attributes used to develop the P score for each track includes a defined pitch by the music service, wherein the high-level acoustic attributes used to develop the T score for each track includes a defined timbre by the music service. In the embodiment, wherein defined rhythm is defined by dividing each track into bars, dividing the bars into beats, and dividing the beats into tatums and utilizing one or more of the tatums, a location of a downbeat, an acceleration/deceleration of components of each track to determine a time signature. In the embodiment, wherein the time signature is identified by a number within a range and a confidence value. In the embodiment, wherein a low confidence value indicates a lack of periodicity.

In the embodiment, wherein the defined pitch is defined by a chroma vector that corresponds to each of 12 pitch classes, wherein a value assigned to each pitch class may depend on a relative dominance of every pitch in a chromatic scale.

In the embodiment, wherein the defined texture is defined by a quality of a musical note or sound by which one type of musical instrument or voice is distinguished from others In the embodiments, wherein the high-level acoustic attributes used to develop the R score for each track includes two or more of a time signature of each track, a measure of danceable qualities of each track, a measure of one or more of intensity and activity of each track, a speed of each track, and a measure of sound quality in decibels of each track. In the embodiments, wherein the time signature is represented by a number within a range and a confidence value corresponding to measured periodicity. In the embodiments, wherein the measure of danceable qualities of each track is based on one or more of a tempo, a rhythm stability, a beat strength, and overall regularity. In the embodiments, wherein the measure of one or more of intensity and activity of each track is based on a dynamic range, a measure of perceived loudness, an onset rate and a general entropy.

In the embodiments, wherein the high-level acoustic attributes used to develop the T score for each track includes two or more of a measure of acoustic qualities of each track, a measure of vocals contained within each track, a measure of one or more of intensity and activity of each track, a measure of a sound presence of one or more of a live audience or voices in each track, and a measure of a sound presence of spoken words in each track. In the embodiments, wherein the measure of one or more of intensity and activity of each track is based on a dynamic range, a measure of perceived loudness, an onset rate and a general entropy.

In the embodiments, wherein the high-level acoustic attributes used to develop the P score for each track includes two or more of a key of each track, a modality of each track, a measure of a positive aspect or a negative aspect of each track, and a measure of a sound presence of spoken words in each track. In the embodiments, wherein the key of each track is based on pitch class notation. In the embodiments, wherein the modality of each track is an indication of whether each track is in a major key or a minor key.

In the embodiment, wherein creating the playlist includes selecting an intensity level for the computer-derived RTP scores corresponding to the one or more categories, wherein the playlist includes the tracks corresponding to one or more categories having computer-derived RTP scores above the selected intensity level.

In an embodiment, a method for categorizing music tracks may comprise: creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined music track among a plurality of predetermined music tracks, each RTP score corresponding to a category among a plurality of categories; extracting low-level data from each music track among a plurality of music tracks to be RTP scored by converting each music track into a plurality of mel-spectrograms, each mel-spectrogram corresponding to a different predetermined period of each music track; analyzing the plurality of mel-spectrograms with a first trained neural network to generate a vector of audio features for each predetermined period; analyzing each vector with a second trained neural network to determine computer-derived RTP scores for each music track among the plurality of music tracks based on the sample set, each computer-derived RTP score corresponding to one RTP score in the sample set; utilizing the computer-derived RTP scores for each music track to determine a corresponding category for each music track among the plurality of categories; and creating a playlist based on music tracks corresponding to one or more categories among the plurality of categories.

In the embodiment, wherein the trained neural network is a resultant classification neural network. In the embodiment, wherein the resultant classification neural network utilizes recurrent layers. In the embodiment, wherein extracting includes extracting desired recurrent layers to generate the vector of audio features for each predetermined period.

In the embodiment, wherein the first trained neural network is trained with an ontology of audio event classes and a collection of human-labeled sound clips.

While certain example or illustrative examples have been described, these examples have been presented by way of example only and are not intended to limit the scope of the subject matter disclosed herein. Indeed, the novel methods and systems described herein may be embodied in a variety of other forms. The accompanying claims and their equivalents are intended to cover such forms or modifications as would fall within the scope and spirit of certain of the subject matter disclosed herein.

What is claimed:
1. A method for categorizing music tracks, comprising:
   creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined music track among a plurality of predetermined tracks, each RTP score corresponding to a category among a plurality of categories;
- extracting low-level data from each track among a plurality of tracks to be RTP scored;
- analyzing the low-level data to develop a plurality of high-level acoustic attributes for each track among the plurality of tracks;
- analyzing the high-level acoustic attributes to develop computer-derived RTP scores for each track among the plurality of tracks based on the sample set, each computer-derived RTP score corresponding to one RTP score in the sample set;
- utilizing the computer-derived RTP scores for each track to determine a corresponding category for each track among the plurality of categories; and
- creating a playlist based on tracks corresponding to one or more categories among the plurality of categories.

2. The method of claim 1, wherein the high-level acoustic attributes used to develop the R score for each track includes two or more of a time signature of each track, a measure of danceable qualities of each track, a measure of one or more of intensity and activity of each track, a speed of each track, and a measure of sound quality in decibels of each track.

3. The method of claim 2, wherein the time signature is represented by a number within a range and a confidence value corresponding to measured periodicity.

4. The method of claim 2, wherein the measure of danceable qualities of each track is based on one or more of a tempo, a rhythm stability, a beat strength, and overall regularity.

5. The method of claim 2, wherein the measure of one or more of intensity and activity of each track is based on a dynamic range, a measure of perceived loudness, an onset rate and a general entropy.

6. The method of claim 1, wherein the high-level acoustic attributes used to develop the T score for each track includes two or more of a measure of acoustic qualities of each track, a measure of vocals contained within each track, a measure of one or more of intensity and activity of each track, a measure of a sound presence of one or more of a live audience or voices in each track, and a measure of a sound presence of spoken words in each track.

7. The method of claim 6, wherein the measure of one or more of intensity and activity of each track is based on a dynamic range, a measure of perceived loudness, an onset rate and a general entropy.

8. The method of claim 1, wherein the high-level acoustic attributes used to develop the P score for each track includes two or more of a key of each track, a modality of each track, a measure of a positive aspect or a negative aspect of each track, and a measure of a sound presence of spoken words in each track.

9. The method of claim 8, wherein the key of each track is based on pitch class notation.

10. The method of claim 8, wherein the modality of each track is an indication of whether each track is in a major key or a minor key.

11. The method of claim 1, wherein the high-level acoustic attributes used to develop the R score for each track includes a defined rhythm by a music service, wherein the high-level acoustic attributes used to develop the P score for each track includes a defined pitch by the music service, wherein the high-level acoustic attributes used to develop the T score for each track includes a defined timbre by the music service.

12. The method of claim 11, wherein defined rhythm is defined by dividing each track into bars, dividing the bars into beats, and dividing the beats into tatums and utilizing one or more of the tatums, a location of a downbeat, an acceleration/deceleration of components of each track to determine a time signature.

13. The method of claim 12, wherein the time signature is identified by a number within a range and a confidence value.

14. The method of claim 13, wherein a low confidence value indicates a lack of periodicity.

15. The method of claim 11, wherein the defined pitch is defined by a chroma vector that corresponds to each of 12 pitch classes, wherein a value assigned to each pitch class may depend on a relative dominance of every pitch in a chromatic scale.

16. The method of claim 11, wherein the defined texture is defined by a quality of a musical note or sound by which one type of musical instrument or voice is distinguished from others.

17. The method of claim 1, wherein creating the playlist includes selecting an intensity level for the computer-derived RTP scores corresponding to the one or more categories, wherein the playlist includes the tracks corresponding to one or more categories having computer-derived RTP scores above the selected intensity level.

18. A method for categorizing streamed music tracks, comprising:
- determining high-level acoustic attributes for a music track through an analyzed extraction of low-level data from the track;
- analyzing the high-level acoustic attributes to develop a computer-derived RTP score for the track based on a sample set, the computer-derived RTP score corresponding to one RTP score in the sample set, wherein the sample set includes a RTP score for a plurality of possible combinations of a rhythm score (R), a texture score (T), and a pitch score (P) respectively from a R range, a T range, and a P range, wherein at least some of which RTP scores each correspond to a human-determined RTP score for a predetermined track among a plurality of predetermined tracks, and wherein each RTP score corresponding to a category among a plurality of categories;
- utilizing the computer-derived RTP score to determine a corresponding category for the track among the plurality of categories; and
- including the track in a playlist based on one or more categories among the plurality of categories.

19. The method of claim 18, wherein the high-level acoustic attributes used to develop the R score for the track includes two or more of a time signature of the track, a measure of danceable qualities of the track, a measure of one or more of intensity and activity of the track, a speed of the track, and a measure of sound quality in decibels of the track.

20. The method of claim 19, wherein the time signature is represented by a number within a range and a confidence value corresponding to measured periodicity.

21. The method of claim 19, wherein the measure of danceable qualities of the track is based on one or more of a tempo, a rhythm stability, a beat strength, and overall regularity.

22. The method of claim 19, wherein the measure of one or more of intensity and activity of the track is based on a dynamic range, a measure of perceived loudness, an onset rate and a general entropy.

23. The method of claim 18, wherein the high-level acoustic attributes used to develop the T score for the track includes two or more of a measure of acoustic qualities of the track, a measure of vocals contained within the track, a measure of one or more of intensity and activity of the track, a measure of a sound presence of one or more of a live audience or voices in the track, and a measure of a sound presence of spoken words in the track.

24. The method of claim 23, wherein the measure of one or more of intensity and activity of the track is based on a dynamic range, a measure of perceived loudness, an onset rate and a general entropy.

25. The method of claim 18, wherein the high-level acoustic attributes used to develop the P score for the track includes two or more of a key of the track, a modality of the track, a measure of a positive aspect or a negative aspect of the track, and a measure of a sound presence of spoken words in the track.

26. The method of claim 25, wherein the key of the track is based on pitch class notation.

27. The method of claim 25, wherein the modality of the track is an indication of whether the track is in a major key or a minor key.

28. The method of claim 18, wherein the determining, the analyzing and the utilizing are performed at a location remote from a user device, wherein the including is performed in response to the user device, and further comprising streaming the playlist to the user device.

29. The method of claim 18, wherein including the track in the playlist is based on a selected intensity level for the computer-derived RTP scores corresponding to the one or more categories, wherein the playlist includes the track if the corresponding computer-derived RTP score for the track is above the selected intensity level.

30. A method for categorizing music tracks, comprising:
creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined music track among a plurality of predetermined music tracks, each RTP score corresponding to a category among a plurality of categories;
extracting low-level data from each music track among a plurality of music tracks to be RTP scored by converting each music track into a plurality of mel-spectrograms, each mel-spectrogram corresponding to a different predetermined period of each music track;
analyzing the plurality of mel-spectrograms with a first trained neural network to generate a vector of audio features for each predetermined period;
analyzing each vector with a second trained neural network to determine computer-derived RTP scores for each music track among the plurality of music tracks based on the sample set, each computer-derived RTP score corresponding to one RTP score in the sample set;
utilizing the computer-derived RTP scores for each music track to determine a corresponding category for each music track among the plurality of categories; and
creating a playlist based on music tracks corresponding to one or more categories among the plurality of categories.

31. The method of claim 30, wherein the trained neural network is a resultant classification neural network.

32. The method of claim 31, wherein the resultant classification neural network utilizes recurrent layers.

33. The method of claim 32, wherein extracting includes extracting desired recurrent layers to generate the vector of audio features for each predetermined period.

34. The method of claim 30, wherein the first trained neural network is trained with an ontology of audio event classes and a collection of human-labeled sound clips.

* * * * *